(12) United States Patent  
Shahana

(10) Patent No.: US 7,527,571 B2
(45) Date of Patent: May 5, 2009

(54) REAR DERAILLEUR FOR BICYCLE

(75) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 541 days.

(21) Appl. No.: 11/208,543

(22) Filed: Aug. 23, 2005

(65) Prior Publication Data
US 2006/0135301 A1 Jun. 22, 2006

(30) Foreign Application Priority Data
Dec. 20, 2004 (JP) ............................. 2004-368224

(51) Int. Cl.
B62M 9/12 (2006.01)
(52) U.S. Cl. .......................................... 474/82; 474/80
(58) Field of Classification Search .................... 474/80, 474/81, 82
See application file for complete search history.

(56) References Cited

U.S. PATENT DOCUMENTS

| 2,839,939 | A |   | 6/1958  | Juy |  |
|---|---|---|---|---|---|
| 3,181,383 | A |   | 5/1965  | Juy |  |
| 3,453,899 | A |   | 7/1969  | Tarutani et al. |  |
| 3,748,916 | A |   | 7/1973  | Morse |  |
| 3,974,707 | A |   | 8/1976  | Nagano |  |
| 4,030,375 | A | * | 6/1977  | Nagano | 474/82 |
| 4,161,124 | A | * | 7/1979  | Juy | 474/82 |
| RE30,524  | E |   | 2/1981  | Nagano |  |
| 4,789,379 | A | * | 12/1988 | Ozaki et al. | 474/82 |
| 4,954,121 | A | * | 9/1990  | Juy | 474/82 |
| 5,190,501 | A |   | 3/1993  | Schwerdhoefer |  |
| 5,302,155 | A | * | 4/1994  | Ishibashi | 474/82 |
| 5,518,456 | A | * | 5/1996  | Kojima et al. | 474/77 |
| 6,093,122 | A | * | 7/2000  | McLaughlin et al. | 474/82 |
| 6,290,620 | B1 |  | 9/2001  | Tsai et al. |  |

FOREIGN PATENT DOCUMENTS

| DE | 2 153 407    | 12/1972 |
|----|--------------|---------|
| DE | 4031982 A1   | 4/1992  |
| EP | 0 655 386 A1 | 5/1995  |
| EP | 0 791 534 A2 | 8/1997  |
| EP | 1069040 B1   | 1/2001  |
| EP | 1 281 610 A2 | 2/2003  |
| FR | 2506251      | 11/1982 |
| JP | 51-43541 A   | 4/1976  |
| JP | 63-137091 A  | 6/1988  |
| JP | 11-263283 A  | 9/1999  |
| JP | 2001-018878 A | 1/2001 |

* cited by examiner

Primary Examiner—Bradley T King
Assistant Examiner—Stephen Bowes
(74) Attorney, Agent, or Firm—Global IP Counselors, LLP

(57) ABSTRACT

The rear bicycle derailleur guides a chain to one of a plurality of rear sprockets. The rear derailleur includes a base member, a linkage assembly, a movable member, a chain guide, a biasing member, and a biasing member connection structure. The base member is mounted to the bicycle frame. The linkage assembly is rotatably linked to the base member and the movable member. The movable member is capable of movement toward or away from the frame by rotation of the linkage assembly. The chain guide is pivotally linked to the movable member. The biasing member biases the movable member relative to the base member. The biasing member connection structure attaches the biasing member in either of two different biasing states to selectively bias the movable member toward or away from the frame.

20 Claims, 13 Drawing Sheets

REAR DERAILLEUR FOR BICYCLE

CROSS-REFERENCE TO RELATED APPLICATIONS

This application claims priority to Japanese Patent Application No. 2004-368224. The entire disclosure of Japanese Patent Application No. 2004-368224 is hereby incorporated herein by reference.

BACKGROUND OF THE INVENTION

1. Field of the Invention

The present invention generally relates to a bicycle derailleur. More specifically, the present invention relates to a rear bicycle derailleur that selectively guides a chain onto each of a plurality of rear sprockets axially arranged along the rotation axis of the rear hub at the rear part of a bicycle frame. The rear bicycle derailleur of the present invention can be switched between a high normal type and a low normal type without removing the derailleur from the frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle rear derailleur.

Bicycles, and particularly sports-type road racers and mountain bikes, are equipped with a rear derailleur that forms an external shifter. This rear derailleur comprises a base member (an example of a stationary member) that can be mounted to the rear part of the frame, a link mechanism with one end that is mounted to the base member, a movable member that is mounted to the other end of the link mechanism and is capable of relative movement with respect to the base member, a chain guide that is pivotably mounted to the link mechanism, and a biasing member that biases the movable member. The biasing member is a coil spring, for example, and is mounted inside the link mechanism. Known types of biasing members include those that bias the movable member away from the frame (see Japanese Laid-Open Patent Application H11-263283, for example), and those that bias the movable member toward the frame (see Japanese Laid-Open Patent Application 2001-18878, for example).

The rear sprocket cluster that meshes with the chain, which is guided by the rear derailleur, has the sprockets lined up in the hub axial direction such that the diameter decreases outward in the axial direction away from the frame. Therefore, with the former type of (high normal) rear derailleur, when the inner wire of the shift cable is released, the movable member is moved away from the frame by the biasing force of the biasing member, and the chain is guided one step/shift at a time to next smaller-diameter sprocket, resulting in an upshift. Conversely, when the link mechanism of the derailleur is pulled by the inner wire, the movable member moves toward the frame against the biasing force of the biasing member, and the chain is guided one step/shift at a time to the next larger-diameter sprocket, resulting in a downshift. A rear derailleur of this configuration is called a high normal type of rear derailleur. With a high-normal rear derailleur, the state in which the chain is disposed on the highest (smallest diameter) rear sprocket is the initial position in a state in which the inner wire is pulling the least amount.

With the latter type of (low normal) rear derailleur, as opposed to a high-normal type, when the inner wire of the shift cable is released, the biasing force of the biasing member moves the movable member toward the frame, and the chain is guided one step/shift at a time to the next larger-diameter sprocket, resulting in a downshift. Conversely, when the link mechanism of the derailleur is pulled by the inner wire, the movable member moves away from the frame against the biasing force of the biasing member, and the chain is guided one step at a time to a smaller-diameter sprocket, resulting in an upshift. A rear derailleur of this configuration is called a low normal type of rear derailleur. With a low-normal rear derailleur, the state in which the chain is disposed on the lowest (largest diameter) rear sprocket is the initial position in a state in which the inner wire is pulling the least amount.

In view of the above, it will be apparent to those skilled in the art from this disclosure that there exists a need for an improved rear bicycle derailleur. This invention addresses this need in the art as well as other needs, which will become apparent to those skilled in the art from this disclosure.

SUMMARY OF THE INVENTION

One object of the present invention is to provide a rear bicycle derailleur that shifts the chain laterally over a plurality of rear sprockets.

Another object of the present invention is to provide a rear bicycle derailleur that can be changed between a high normal type and a low normal type without having to remove/replace the rear derailleur.

A high-normal rear derailleur must be pulled by the inner wire in order to make a downshift. With a high-normal rear derailleur, a downshift requires a relatively higher operating effort than with a low normal type. Furthermore, upshifts and downshifts with the front and rear derailleurs are made with opposite fingers when operating the two shift levers. More specifically, with the front derailleur, an upshift is made with the thumb and a downshift with the index finger, whereas with the rear derailleur, a downshift is made with the thumb and an upshift with the index finger. This can make shifting difficult to master for novice riders. However, since the inner wire is pulled during a rear downshift, the chain can be guided to the desired sprocket by over-shifting (guiding the chain slightly to the larger-diameter sprocket side of the desired sprocket position). For this reason, the high normal type of rear derailleur was the most commonly used in the past.

Meanwhile, with a low-normal rear derailleur a downshift is performed by means of the biasing force of the biasing member, so the operating effort required for a downshift is lighter and the downshift can be made faster. However, since the operation of the shift levers is backwards from that of the conventional high normal type, an experienced rider has to relearn the shifting control operation. More recent rear sprockets are provided with a special recessed portion to aid downshifting, but if this special shape becomes worn through extended use, or if the special recess becomes packed with mud as a result of riding on muddy roads, there is the undesirable possibility that shifting can no longer be performed smoothly since a downshift is made solely by means of the biasing force of the biasing member with a low normal type.

The selection of a high or low normal type is left up to the rider's discretion, but in the past, once the selection was made, the whole rear derailleur had to be replaced if the owner decided to change to the other configuration. Also, it was impossible to change the configuration as dictated by the riding situation or application, such as determined by riding on muddy roads or on paved roads.

The present invention allows an owner to change a bicycle rear derailleur back and forth between high and low normal types without having to replace the rear derailleur.

A bicycle rear derailleur in accordance with a first aspect of the present invention is provided that includes a base member, a linkage assembly (link mechanism), a movable member, a chain guide, a biasing member and a biasing member connection structure. The base member is configured and arranged to be mounted to a rear part of a bicycle frame. The linkage assembly is pivotally coupled to the base member. The movable member is pivotally coupled to the linkage assembly such that the movable member is capable of movement toward and away from the bicycle frame. The chain guide is pivotally coupled to the movable member. The biasing member is arranged to bias the movable member relative to the base member. The biasing member connection structure is configured and arranged to selectively mount the biasing member to the rear derailleur in a first biasing state when the biasing member is coupled in a first biasing position and a second biasing state when the biasing member is coupled in a second biasing position. The biasing member is arranged to bias the movable member away from the bicycle frame in the first biasing state and the biasing member being arranged to bias the movable member toward the bicycle frame in the second biasing state. In other words, the derailleur guides a chain to one of a plurality of sprockets lined up in the hub axial direction at the rear part of a bicycle frame, and includes a biasing member connection structure (biasing member latching component) that is capable of selectively latching the biasing member in either a first biasing state in which the biasing member biases the movable member away from the frame, or a second biasing state in which the biasing member biases the movable member toward the frame.

With this rear derailleur, when the biasing member is latched to the biasing member connection structure so as to produce the first biasing state, the movable member is biased away from the frame, and the rear derailleur is in a high-normal state. Conversely, when the biasing member is latched so as to produce the second biasing state, the movable member is biased toward the frame, and the rear derailleur is in a low-normal state. Since a biasing member connection structure is provided that is capable of switching between two biasing states (the first biasing state and second biasing state), a high-normal configuration can be changed to a low-normal configuration, and vice versa, merely by latching the biasing member to the biasing member connection structure so as to provide one of these biasing states, and without having to replace the derailleur.

In a bicycle rear derailleur in accordance with a second aspect of the present invention, the linkage assembly includes an inner link member and an outer link member located further from the bicycle frame than the inner link member, where each of the inner and outer link members is pivotally coupled to both the base member and the movable member. In other words, the linkage assembly has an inner link member for rotatably linking the base member and the movable member at both ends, and an outer link member for rotatably linking the base member and the movable member at both ends on the outer side of the inner link member. In this case, since the movable member and the base member are linked by inner and outer link members, the derailleur structure is simpler, and the movable member can be moved in the radial direction while also being moved toward or away form the frame by adjusting the rotational angle of the links.

In a bicycle rear derailleur in accordance with a third aspect of the present invention, the inner and outer link members are spaced from each other to form an internal area of the linkage assembly between them, and the biasing member is disposed outside of the internal area of the linkage assembly. In other words, the biasing member is disposed on the outside of the linkage assembly. In this case, since the biasing member is provided on the outside of the linkage assembly, the biasing member is exposed on the outside of the linkage assembly, which makes it easy to change the latching position of the biasing member.

In a bicycle rear derailleur in accordance with a fourth aspect of the present invention, the inner and outer link members are spaced from each other to form an internal area of the linkage assembly between them, and the biasing member is disposed within the internal area of the linkage assembly. In other words, the biasing member is disposed on the inside of the linkage assembly. In this case, since the biasing member is provided on the inside of the linkage assembly, the biasing member is not exposed on the outside. While this arrangement may cause changing the biasing position more difficult, the biasing member is not exposed on the outside. Thus, there is an aesthetic improvement. Also, the biasing member will not snag on external components or debris. Finally, the biasing member will not be exposed such that it is difficult for mud to adhere to the biasing member.

In a bicycle rear derailleur in accordance with a fifth aspect of the present invention, the biasing member is a coil spring having a first end, a second end, and a coil component disposed between the first and second ends, and the biasing member connection structure includes a first latching component provided at the base member that is arranged and configured to attach the first end of the coil spring thereto, and a second latching component provided at the movable member that is arranged and configured to selectively attach the second end of the coil spring thereto in an inner position to achieve the first biasing state when the biasing member is in the first biasing position and in an outer position that is farther away from the bicycle frame than the inner position to achieve the second biasing state when the biasing member is in the second biasing position. In other words, the first latching component that is provided to the base member is capable of latching the first end, and the second latching component that is provided to the movable member is capable of latching the second end at either a first position or a second position that is farther away from the frame than the first position. The first biasing state results when the biasing member is latched at the first latching component and the first position of the second latching component, and the second biasing state results when the biasing member is latched at the first latching component and the second position of the second latching component. In this case, it is possible to switch between two biasing states, and to switch between the first and second biasing states with ease, merely by relocating, by latching to one of the positions of the second latching component provided to the movable member, the second end of the biasing member whose first end is latched by the first latching component provided to the base member.

In a bicycle rear derailleur in accordance with a sixth aspect of the present invention, the biasing member is a coil spring having a first end, a second end, and a coil component disposed between the first and second ends, and the biasing member connection structure includes a first latching component provided at the movable member that is arranged and configured to attach the second end of the coil spring thereto, and a second latching component provided at the base member that is arranged and configured to selectively attach the first end of the coil spring thereto in an outer position to achieve the first biasing state when the biasing member is in the first biasing position and an inner position that is closer to the bicycle frame than the outer position to achieve the second biasing state when the biasing member is in the second biasing position. In other words, the first latching component that is provided to the movable member is capable of latching the second end, and the second latching component that is provided to the base member is capable of latching the first end at either a first position or a second position that is closer to the frame than the first position. The second biasing state results when the biasing member is latched at the first latching component and the second position of the second latching component, and the first biasing state results when the biasing member is latched at the first latching component and the first position of the second latching component. In this case, it is possible to switch between two biasing states, and to switch between the first and second biasing states with ease, merely by relocating, by latching to one of the positions of the second latching component provided to the base member, the first end of the biasing member whose second end is latched by the first latching component provided to the movable member.

In a bicycle rear derailleur in accordance with a seventh aspect of the present invention, the second latching component includes a pivoting member having a proximal end pivotally mounted at a location between the inner position and the outer position, and a distal end with a spring connector that is movable between the inner and outer positions. In other words, the second latching component has a pivoting member whose proximal end is pivotably provided between the first position and the second position, and the pivoting member is capable of latching One end of the biasing member (e.g. the second end) and capable of movement between the first position and the second position.

In a bicycle rear derailleur in accordance with an eighth aspect of the present invention, the second latching component further includes a pair of stopper members provided at the movable member to limit movement of the pivoting member when the distal end of the pivoting member is located in the inner and outer positions. In other words, the second latching component further has a stopper member provided to the movable member such that the pivoting position of the pivoting member is positioned at the first position and the second position. In this case the stopper member makes it easy to switch the pivoting position between first and second positions.

In a bicycle rear derailleur in accordance with a ninth aspect of the present invention, the inner and outer link members are pivotally coupled to the base member at inner and outer base pivot points, and the first latching component is disposed between the inner and outer pivot points. In other words, the first latching component is disposed between the linking positions of the two link members. In this case, since the first latching component is disposed between the linking positions of the two link members, the biasing force can be kept uniform in the two biasing states.

In a bicycle rear derailleur in accordance with a tenth aspect of the present invention, the biasing member is a coil spring having a first end, a second end, and a coil component disposed between the first and second ends, and the biasing member connection structure includes a first latching component provided at the base member that is arranged and configured to selectively attach the first end of the coil spring thereto in a third position to achieve the second biasing state when the biasing member is in the second biasing position and a fourth position that is farther away from the bicycle frame than the third position to achieve the first biasing state when the biasing member is in the first biasing position, and a second latching component is provided at the movable member that is arranged and configured to selectively attach the second end of the coil spring thereto in a first position to achieve the first biasing state when the biasing member is in the first biasing position and in a second position that is farther away from the bicycle frame than the first position to achieve the second biasing state when the biasing member is in the second biasing position. In other words, the first latching component that is provided to the base member is capable of latching the first end at either a third position or a fourth position that is farther away from the frame than the third position, and the second latching component that is provided to the movable member is capable of latching the second end at either a first position or a second position that is farther away from the frame than the first position. The first biasing state results when the biasing member is latched at the fourth position and the first position, and the second biasing state results when the biasing member is latched at the third position and the second position. In this case, the biasing force of the biasing member can be kept constant regardless of the state by relocating both ends of the biasing member. Also, when the biasing member is disposed on the inside of the linkage assembly, linking (pivot) pins that link the two link members to the base member and the movable member can be used as the first and second latching components.

In a bicycle rear derailleur in accordance with an eleventh aspect of the present invention, the inner and outer link members are pivotally coupled to the base member at inner and outer base pivot points, and the third position is disposed at the inner base pivot point and the fourth position is disposed at the outer base pivot point. The inner and outer link members are pivotally coupled to the movable member at inner and outer movable pivot points, and the first position is disposed at the inner movable pivot point and the second position is disposed at the outer movable pivot point. In other words, the third position is disposed at the linking position on the base member side of the inner link member, and the fourth position at the linking position on the base member of the outer link member, and the first position is disposed at the linking position on the movable member side of the inner link member, and the second position at the linking position on the movable member of the outer link member. In this case, the middle parts or ends of the linking pins that link the two link members can be used as the first and second latching components.

In a bicycle rear derailleur in accordance with a twelfth aspect of the present invention, at least one of the first and second latching components includes a pivoting member having a proximal end pivotally mounted at a location between the respective third and fourth positions or the respective first and second positions, and a distal end with a spring connector that is movable between the respective third and fourth positions or the respective first and second positions. In other words, the first latching component and/or the second latching component has a pivoting member whose proximal end is pivotally provided between the third position and the fourth position or between the first position and the second position, and the pivoting member is capable of latching the first end or the second end and capable of movement between the third position and the fourth position or between the first position and the second position. In this case, it is easy to switch between the first and second biasing states merely by pivoting the pivoting member to the first or second position, or to the third or fourth position. The biasing member can remain latched to or can be released from the pivoting member during the pivoting.

In a bicycle rear derailleur in accordance with a thirteenth aspect of the present invention, the at least one of the first and second latching components with the pivoting member further includes a pair of stopper members provided at the respective base member or the respective movable member to limit movement of the pivoting member when the distal end of the pivoting member is located in the respective third and fourth positions or the respective first and second positions. In other words, the first latching component and/or the second latching component further has a stopper member provided to the base member or the movable member such that the pivoting position of the pivoting member is positioned at the third position and the fourth position or at the first position and the second position. In this case, the stopper members make it easy to position at the first and second positions, or at the third and fourth positions.

In a bicycle rear derailleur in accordance with a fourteenth aspect of the present invention, the biasing member is a coil spring having a first end, a second end, and a coil component disposed between the first and second ends, and the biasing member connection structure includes a first latching component provided at the base member that is arranged and configured to attach the first end of the coil spring thereto, and a second latching component that is arranged and configured to selectively attach the second end of the coil spring thereto in an inner position at the inner link member to achieve the first biasing state when the biasing member is in the first biasing position and in an outer position at the outer link member to achieve the second biasing state when the biasing member is in the second biasing position. In other words, the first latching component that is provided to the base member is capable of latching the first end, and the second latching component is capable of latching the second end at either a first position provided to the inner link member or a second position provided to the outer link member. The first biasing state results when the biasing member is latched at the first latching component and the first position of the second latching component, and the second biasing state results when the biasing member is latched at the first latching component and the second position of the second latching component. In this case, it is possible to switch between two biasing states, and to switch between the first and second biasing states with ease, merely by relocating, by latching the second end, the biasing member whose first end is latched by the first latching component provided to the base member, to either the second position of the second latching component provided to the inner link member or to the second position provided to the outer link member.

In a bicycle rear derailleur in accordance with a fifteenth aspect of the present invention, the biasing member is a coil spring having a first end, a second end, and a coil component disposed between the first and second ends, and the biasing member connection structure includes a first latching component provided at the movable member that is arranged and configured to attach the second end of the coil spring thereto, and a second latching component that that is arranged and configured to selectively attach the first end of the coil spring thereto in an outer position at the outer link member to achieve the first biasing state when the biasing member is in the first biasing position and an inner position at the inner link member to achieve the second biasing state when the biasing member is in the second biasing-position. In other words, the first latching component that is provided to the movable member is capable of latching the second end, and the second latching component is capable of latching the first end at either a first position provided to the outer link member or a second position provided to the inner link member. The second biasing state results when the biasing member is latched at the first latching component and the second position of the second latching component, and the first biasing state results when the biasing member is latched at the first latching component and the first position of the second latching component. In this case, it is possible to switch between two biasing states, and to switch between the first and second biasing states with ease, merely by relocating just the first end of the biasing member whose second end is latched by the first latching component provided to the movable member, to either the second position of the second latching component provided to the inner link member or to the first position provided to the outer link member.

In a bicycle rear derailleur in accordance with a sixteenth aspect of the present invention, the derailleur further includes an inner wire connection structure arranged and configured to attach an inner wire of a shift cable thereto. The inner wire connection structure is arranged to connect the inner wire in a first inner latching position when the biasing member is mounted to the rear derailleur in the first biasing state and the inner wire connection structure is arranged to connect the inner wire in a second inner latching position when the biasing member is mounted to the rear derailleur in the second biasing state. In other words, the inner wire connection structure (latching component) has a first inner latching position for use in the first biasing state, and a second inner latching position for use in the second biasing state. In this case, since the inner latching component has two inner latching positions to be used according to the biasing state, the inner wire can be latched at the proper position according to whether the state is a high normal or low normal type.

In a bicycle rear derailleur in accordance with a seventeenth aspect of the present invention, the inner wire connection structure is removably attached to the linkage assembly. In this case, since the inner wire connection structure is removable, a single inner latching component can be mounted at either of two latching positions according to the biasing state.

In a bicycle rear derailleur in accordance with a eighteenth aspect of the present invention, the inner wire connection structure is attached to the outer link member when the biasing member is mounted to the rear derailleur in the first biasing state, and the inner wire connection structure is attached to the inner link member when the biasing member is mounted to the rear derailleur in the second biasing state. In other words, the inner latching component is attached to the outer link member in the first biasing state, and is attached to the inner link member in the second biasing state. In this case, the inner wire can be latched at the proper position regardless of the biasing state by changing the link member to which the inner latching component is mounted according to the biasing state.

In a bicycle rear derailleur in accordance with a nineteenth aspect of the present invention, the rear derailleur further includes an outer casing connection structure arranged and configured to hold an outer casing of a shift cable. The outer casing connection structure is arranged and configured to hold the outer casing in a first outer latching position when the biasing member is mounted to the rear derailleur in the first biasing state and is arranged and configured to hold the outer casing in a second outer latching position when the biasing member is mounted to the rear derailleur in the second biasing state. In other words, the outer casing connection structure internally accommodates the inner wire, while holding the outer casing. The outer casing connection structure has a first outer latching position for use in the first biasing state, and a second outer latching position for use in the second biasing state. In this case, even if the latching position of the inner wire is changed according to the biasing state, the latching position of the outer casing can be changed correspondingly, so flexion of the inner wire from the outer latching position to the inner latching position can be suppressed, affording smoother movement of the inner wire.

In a bicycle rear derailleur in accordance with a twentieth aspect of the present invention, the outer casing connection structure includes an outer holding member that is removably attached to the base member. The outer holding member is attached at the first outer latching position when the biasing member is mounted to the rear derailleur in the first biasing state and is attached at the second outer latching position when the biasing member is mounted to the rear derailleur in the second biasing state. In other words, an outer latching component is removably attached to the base member to adjust the position of the outer casing depending on the biasing state. In this case, since the outer latching component is removable, a single outer latching component can be mounted at either of two positions according to the biasing state.

In a bicycle rear derailleur in accordance with a twenty-first aspect of the present invention, the inner link member is pivotally coupled to the base member by a first inner pivot pin and pivotally coupled to the movable member by a second inner pivot pin, and the outer link member is pivotally coupled to the movable member by a first outer pivot pin and pivotally coupled to the movable member by a second outer pivot pins. At least one of the first pivot pins and second pivot pins are detachably mounted to the inner link member and the outer link member using a removable retainer member. In other words, the inner link member and outer link member each have a first linking pin for linking to the base member and a second linking pin for linking to the movable member, and either the first linking pins or the second linking pins are detachably mounted to the inner link member and outer link member using a removable retainer member. In this case, since either the first or second linking pins are removable, the replacement of the biasing member is particularly easy when the biasing member is disposed inside the linkage assembly.

With the present invention, since a biasing member connection structure is provided that is capable of switching between two biasing states (a first biasing state and a second biasing state), it is possible to change between high-normal and low-normal configurations merely by latching the biasing member to a biasing member connection structure so as to produce one of two biasing states, without having to replace the derailleur.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
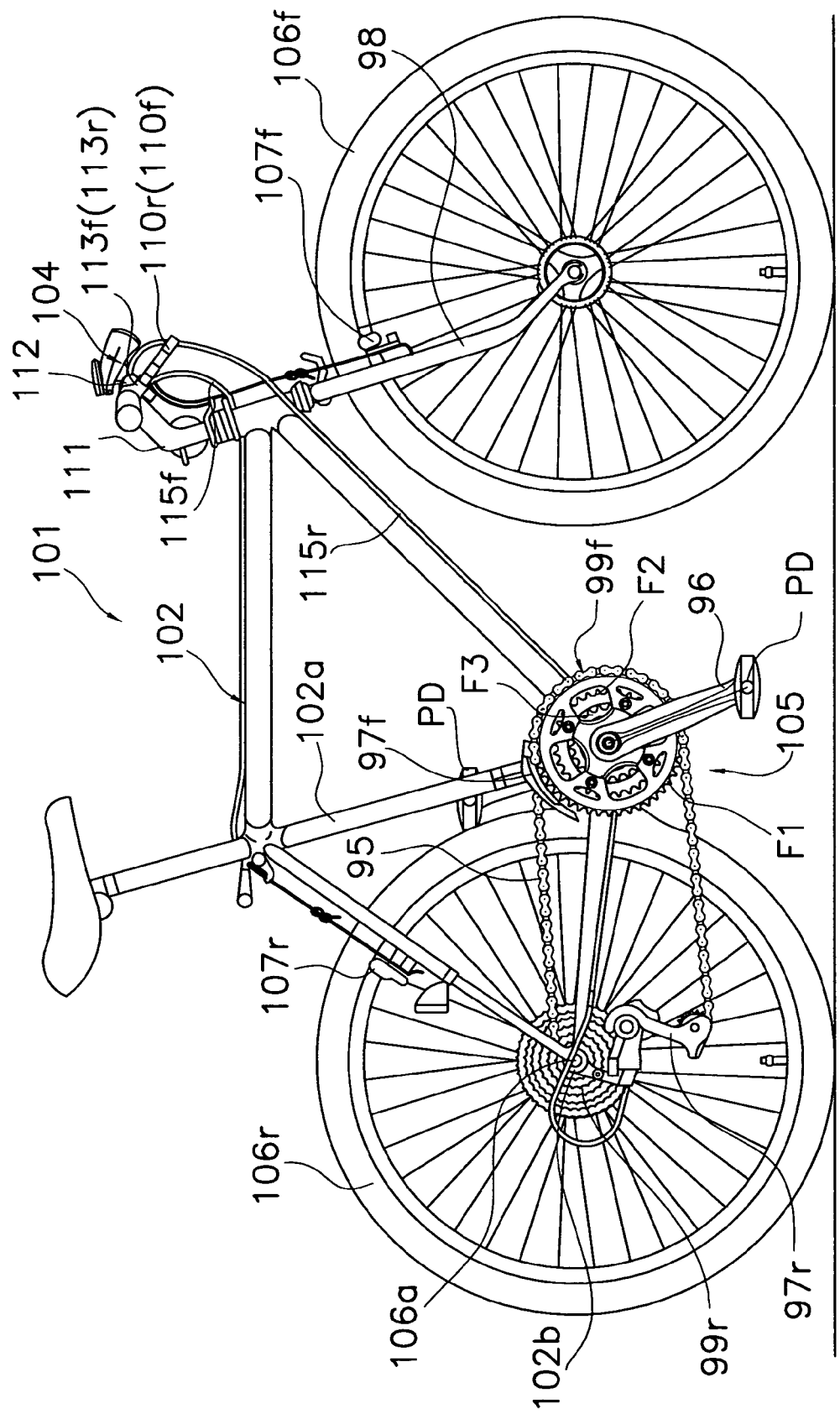
FIG. 1 is a side elevational view of a bicycle equipped with a rear derailleur in accordance with a first embodiment of the present invention.

Referring initially to FIG. 1, a bicycle 101 is illustrated with a rear derailleur 97r in accordance with a first embodiment of the present invention. The rear derailleur 97r of the present invention can be biased toward the bicycle 101 or away from the bicycle 101 without having to replace the derailleur, as explained below in more detail. The bicycle 101 illustrated in FIG. 1 is a bicycle capable of traversing uneven terrain, i.e. a "mountain" bike. The bicycle 101 basically includes a frame 102, a drive train (component) 105, front and rear wheels 106f and 106r, front and rear brake devices 107f and 107r, and a pair of (front and rear) shift control devices 110f and 110r. The frame 102 has diamond shape. A front fork 98 is pivotally coupled to the frame 102 and a handlebar component 104 is fixedly attached to the front fork 98 to steer the bicycle 101. The drive train (component) 105 includes a crank set 96 to which a pair of pedals PD are mounted, front and rear derailleurs 97f and 97r, front and rear sprocket clusters 99f and 99r (i.e. a plurality of front chain rings and a rear sprocket cassette), and a freewheel (not shown) mounted between the rear sprocket cluster 99r and the rear hub of the rear wheel 106r. The front and rear wheels 106f and 106r are mounted to the front fork 98 and the rear part (rear triangle) of the frame 102, respectively. The front and rear brake devices 107f and 107r are provided to selectively apply braking forces to the front and rear wheels 106f and 106r, respectively. The shift control devices 110f and 110r are operated by the rider in order to control movement of the front and rear derailleurs 97f and 97r, respectively.

The handlebar component 104 includes a handlebar stem 111 and a handlebar 112 inserted into and fixedly attached to the top end of the handlebar stem 111. The handlebar stem 111 is inserted into and fixedly attached to the upper part of the front fork 98 to steer the front fork 98, and thus, to steer the front wheel 106f. The handlebar 112 is a flat bar type. A pair of (left and right) brake levers 113f and 113r are mounted on the handlebar 112 to control the front and rear brake devices 107f and 107r, respectively. In the illustrated embodiment, the brake levers 113f and 113r are integrated with the shift control devices 110f and 110r. However, brake control devices with the brake levers 113f and 113r can be provided that are separate from the shift control devices 110f and 110r, respectively. The shift control devices 110f and 110r are operatively coupled (linked) to the front and rear derailleurs 97f and 97r via Bowden shift cables 115f and 115r, respectively. Each of the shift cables 115f and 115r includes an inner wire and an outer sheath in a conventional manner.

The drive train (component) 105 includes a chain 95 used to propel the bicycle 101. Specifically, the chain 95 is wrapped onto the front and rear sprocket clusters 99f and 99r such that when the rider rotates the crankset 96 via the pedals PD, the bicycle 101 can be propelled in a forward direction in a conventional manner. The front and rear derailleurs 97f and 97r are used to move the chain 95 laterally onto different sprockets of the front and rear sprocket clusters 99f and 99r, respectively, in order to control the gear ratio of the drive train 105. The front derailleur 97f is mounted on a seat tube 102a of the frame 102 to guide the chain 95 between at least two front shift positions using the shift control device 110f to selectively pull and release the shift cable 115f. The rear derailleur 97r is mounted to a rear tab 102b at the rear part (rear triangle) of the frame 102 to guide the chain 95 between a plurality (e.g. ten) of different shift positions using the shift control device 110r to selectively pull and release the shift cable 115r. Preferably, the number of rear shift positions corresponds to the number of rear sprockets of the rear sprocket cluster 99r.

Figure 2:
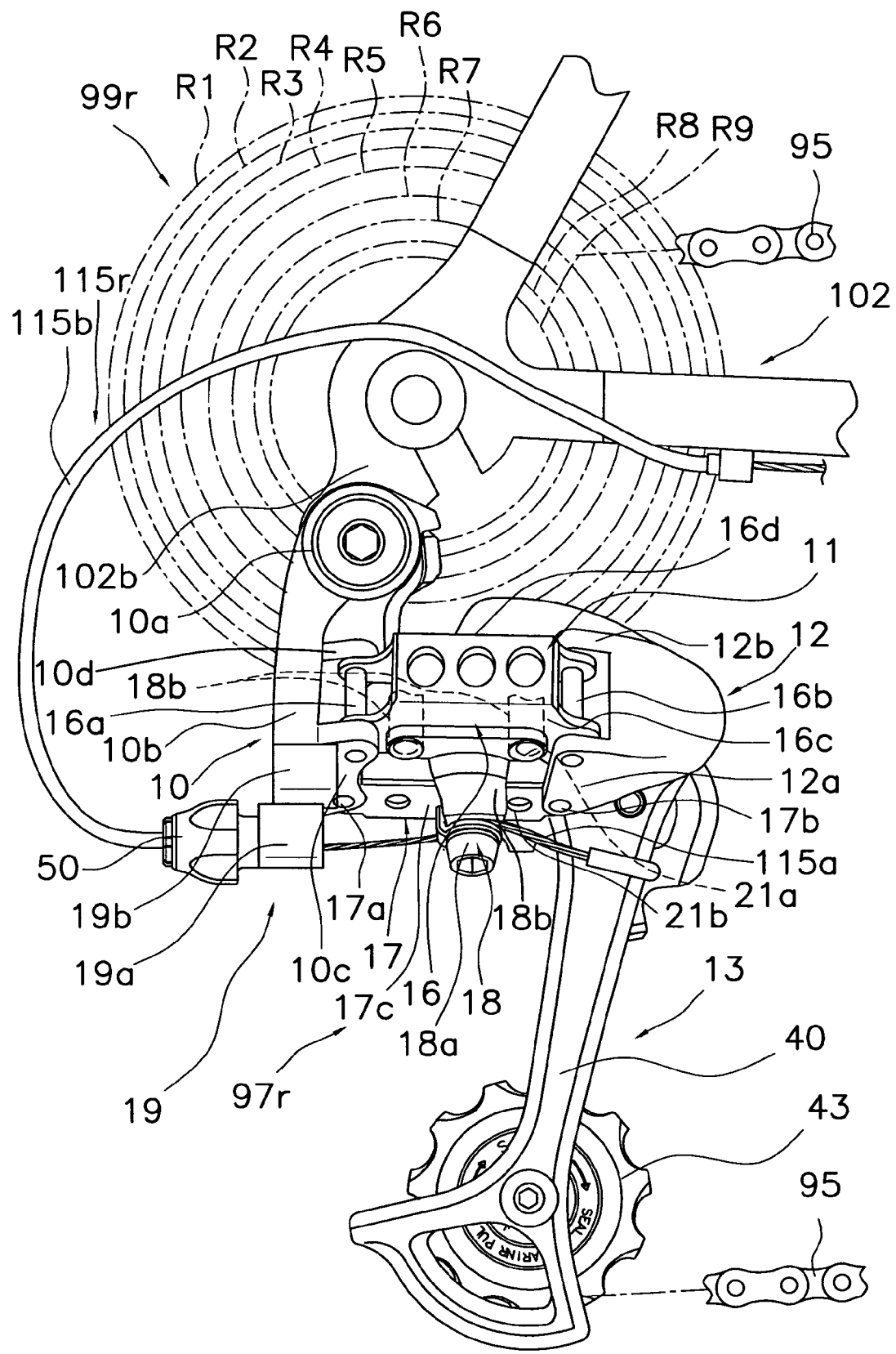
FIG. 2 is an enlarged side elevational view of the rear derailleur and a portion of the bicycle illustrated in FIG. 1.

As shown in FIG. 1, the front sprocket cluster 99f has three (for example) front sprockets F1, F2, and F3, which have different numbers of teeth and are lined up in the axial direction of the crank spindle. As shown in FIG. 2, the rear sprocket cluster 99r has nine (for example) rear sprockets R1 to R9, which have different numbers of teeth and are lined up in the axial direction along a hub axle 106a of the rear wheel 106r. On the front sprocket cluster 99f, the number of teeth increases from the low sprocket F1 (the innermost sprocket in the axial direction) such that the number of teeth is largest on the top sprocket F3 (the outermost sprocket in the axial direction). On the rear sprocket cluster 99r, the number of teeth decreases from the low sprocket R1 (the innermost sprocket in the axial direction) such that the number of teeth is smallest on the top sprocket R9 (the outermost sprocket in the axial direction). The front and rear derailleurs 97f and 97r perform shifts by moving the chain 95 to a different one of the plurality of sprockets F1 to F3 and/or to a different one of the plurality of sprockets R1 to R9, respectively. This shifting is initiated by the shift control devices 110f and 110r, which utilize the integrated brake levers 113f and 113r, as shown in FIG. 1.

Structure of Rear Derailleur

Figure 3:
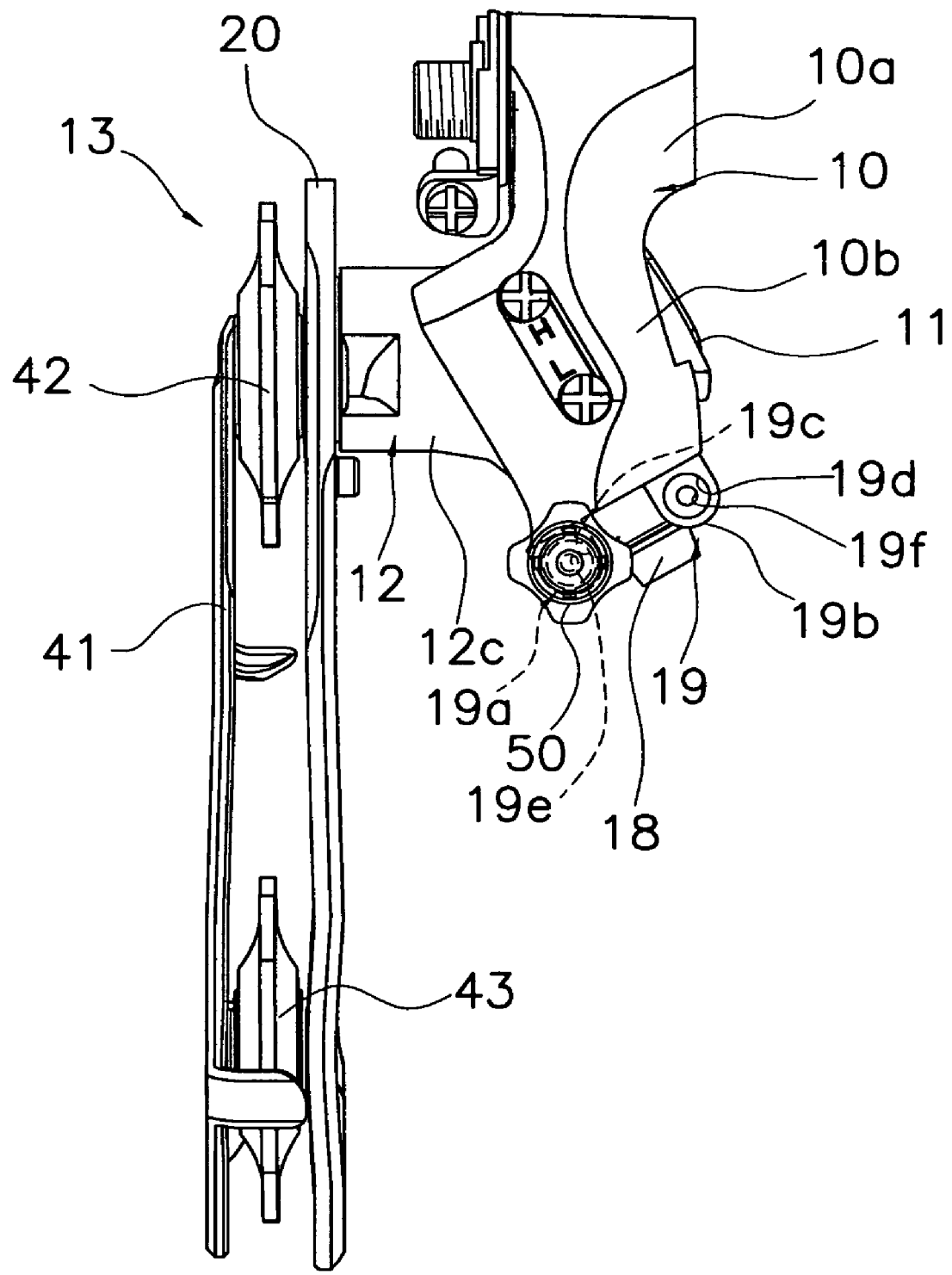
FIG. 3 is a rear elevational view of the rear derailleur illustrated in FIG. 2.
Figure 4:
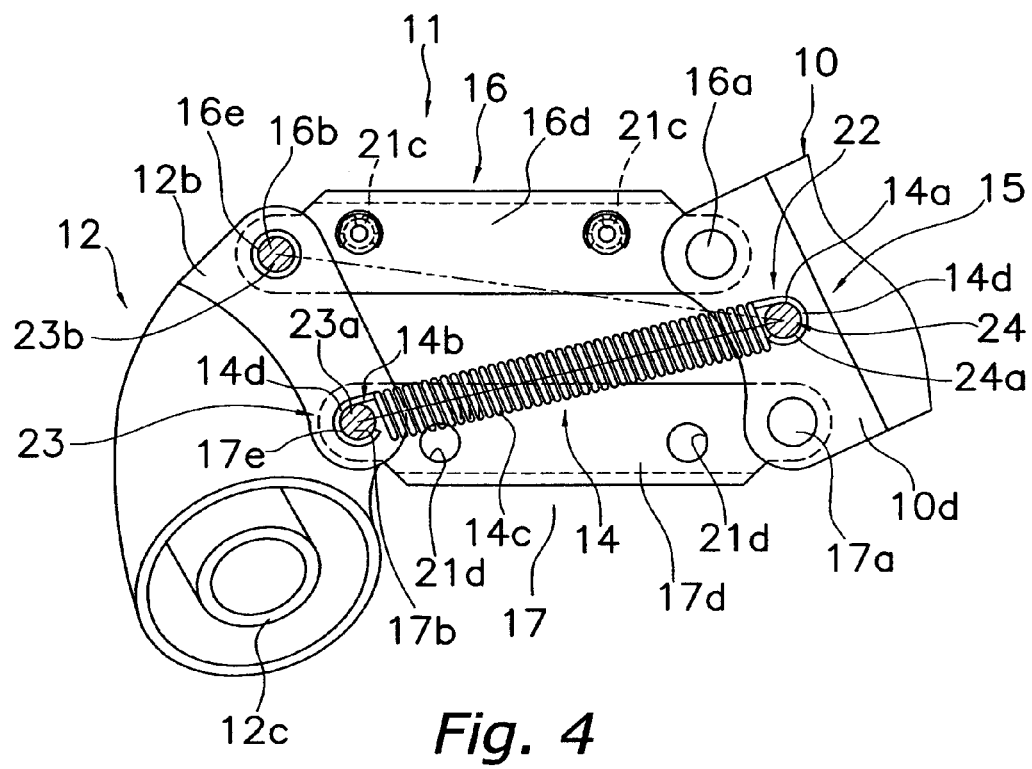
FIG. 4 is a partial, top inclined view of the area near the linkage assembly of the rear derailleur illustrated in FIGS. 1-3, with the biasing member located in the first biasing state.

As shown in FIGS. 2 to 6, the rear derailleur 97r is mounted on the rear tab 102b provided at the rear part of the bicycle frame, and guides the chain 95 to one of the plurality of sprockets R1 to R9 on the rear sprocket cluster 99r. The rear derailleur 97r includes a base member 10, a linkage assembly (link mechanism) 11, a movable member 12, a chain guide 13, a biasing member 14 and a biasing member connection structure (latching component) 15. The base member 10 is a stationary member given that it does not move laterally relative to the bicycle frame 102. The base member 10 is threadedly attached to the rear tab 102b of the frame 102. The linkage assembly (mechanism) 11 is pivotally coupled (rotatably linked) to the base member 10. The movable member 12 is pivotally coupled (linked) to the linkage assembly 11 such that the movable member 12 can be moved laterally toward and away from the frame 102 (i.e. laterally toward and away from a center plane of the bicycle 101). The chain guide 13 is pivotally mounted to the movable member 12. The biasing member 14 biases the movable member 12 either toward or away from the center plane of the bicycle 101 as explained below. The biasing member 14 illustrated herein is coil spring (an example of one suitable type of biasing member), as seen in FIG. 4, for biasing the movable member 12. The biasing member connection structure (latching component) 15 is capable of selectively latching the biasing member (spring) 14 in either a first biasing state corresponding to a high-normal bias or a second biasing state corresponding to a low-normal bias. Thus, the biasing member connection structure 15 can be considered a spring latching component as seen in FIG. 4. Also, the rear derailleur 97r is equipped with an inner wire connection structure (latching component) 18 that attaches an inner wire 115a of the shift cable 115r to the rear derailleur 97r and an outer casing connection structure (latching component) 19 that receives an outer casing 115b of the shift cable 115r, as explained in more detail below.

The base member 10 basically includes a cylindrical mounting boss or mounting bolt 10a, an arm portion (component) 10b, and a pair of link support portions or flanges 10c and 10d. The cylindrical boss 10a can be threaded into a corresponding threaded opening of the rear tab 102b of the frame 102 to fixedly attach the mounting boss 10a to the rear tab 102a. The arm portion 10b extends in the radial direction from the mounting boss 10a. The pair of link support portions 10c and 10d are formed at the distal end and in the middle area of the arm portion (component) 10b for mounting the linkage assembly (mechanism) 11. The link support portion 10c is disposed at a position farther away from the frame 102 than the link support portion 10d. The arm portion 10b is mounted on the boss 10a for limited relative movement relative to the boss 10a with an additional biasing member (not shown) such as a torsion coil spring (not shown) mounted on the inside of the arm portion to normally bias the arm portion 10b rotationally in the counterclockwise direction relative to the boss 10a when viewed from the outside in a conventional manner. The outer casing connection structure 19 that receives the outer casing 115b of the shift cable 115r is provided on the distal end of the arm portion 10b.

The linkage assembly (mechanism) 11 is a four-point linkage assembly that connects the movable member 12 to the base member 10 to form a four bar linkage such that the movable member 12 is capable of parallel movement relative to the base member 10. The linkage assembly (mechanism) 11 basically includes an outer link member 16 and an inner link member 17 disposed at a position closer to the frame 102 than the outer link member 16. The link members 16 and 17 are rotatably mounted at one end via the link support portions 10c and 10d formed at the lower end of the base member 10. The other ends of the two link members 16 and 17 are rotatably mounted to a pair of link support portions or flanges 12a and 12b of the movable member 12 (discussed below). The link member 16 is rotatably coupled (linked) to the base member 10 and the movable member 12 by two pivot (linking) pins 16a and 16b, respectively, while the link member 17 is rotatably coupled (linked) to the base member 10 and the movable member 12 by two pivot (linking) pins 17a and 17b, respectively. The (first and second) outer pivot pins 16a and 16b are outer pivot pins that that are disposed farther away from the frame 102 (i.e. further from the center plane of the bicycle 101) than the (first and second) inner pivot pins 17a and 17b. The pivot pins 16a and 16b are crimped to the outer link member 16, while the pivot pins 17a and 17b are crimped to the inner link member 17. A pair of mounting sections (latching component mounts) 21a and 21b are formed on the outer surfaces 16c and 17c of the outer and inner link members 16 and 17, respectively, for removably mounting the inner wire connection structure 18. In particular, the mounting section (latching component mounts) 21a has through holes 21c that pass through the outer surface 16c of the outer link member 16 and through the inner surface 16d, while the mounting section (latching component mounts) 21b has through holes 21d that pass through the outer surface 17c and the inner surface 17d of the inner link member 17. The inner and outer link members 17 and 16 are spaced from each other to form an internal area of the linkage assembly 11 therebetween. The biasing member 14 can be disposed outside of the internal area of the linkage assembly 11, or inside the internal area of the linkage assembly 11 (discussed below in another embodiment).

The movable member 12 serves to connect (link) the chain guide 13 to the linkage assembly 11 such that the chain guide 13 is pivotal around an axis that is substantially parallel to the hub axle 106a of the rear wheel 106r. The movable member 12 basically includes the link supports 12a and 12b that rotatably support the link members 16 and 17 of the linkage assembly (mechanism) 11 and a guide mounting portion 12c on which the chain guide 13 is pivotably mounted. A torsion coil spring (not shown) is mounted on the inside of the guide mounting portion 12c, and this torsion coil spring biases the chain guide 13 in the clockwise direction when viewed from outside. Thus, the derailleur 97r will apply the appropriate tension to the chain 95 for optimum performance. Specifically, the resulting tension on the chain 95 makes it less likely that the chain 95 will fall off the sprockets R1 to R9.

The chain guide 13 serves to move the chain 95 in order to engage the chain 95 with the desired one of the sprockets R1 to R9 in order to provide the desired gear ratio. The chain guide 13 basically includes an outer guide plate (member) 40, an inner guide plate (member) 41, a guide pulley 42 and a tension pulley 43. The outer guide plate 40 is pivotally attached (mounted) to the movable member 12. The inner guide plate 41 is disposed across from the outer guide plate 40 toward the center plane of the bicycle 101. The guide pulley 42 is rotatably mounted between the guide plate members 40 and 41 at one end of the plate members 40 and 41, while the tension pulley 43 is rotatably mounted between the plate members 40 and 41 at the other end of the guide plates 40 and 41. Thus, the guide plates 40 and 41 are fixedly attached to each other in a spaced relationship. The pulleys 42 and 43 are configured and arranged to mesh with the chain 95 to direct the chain between the guide plates 40 and 41 onto the rear sprockets R1 to R9.

As shown in FIG. 4, the biasing member (spring) 14 is disposed on the outside of the linkage assembly (mechanism) 11 (i.e. the biasing member 14 is not located within the linkage assembly 11 between the link members 16 and 17). Specifically, as shown in FIG. 4, the spring 14 is disposed on the inner, upper side of the linkage assembly (mechanism) 11 near the frame 102. However, the spring 14 may instead be disposed on the outer, lower side of the linkage assembly (mechanism) 11 farther away from the frame 102. The biasing member 14 is preferably a coil spring having a first end 14a, a second end 14b, and a coil component 14c disposed between the first and second ends 14a and 14b. For example, the biasing member 14 is preferably a tension spring whose free length is in a state of close contact. A bent hook 14d is formed at each of the first and second ends 14a and 14b that are connected (i.e. hooked or latched) to the biasing member connection structure 15. The biasing member connection structure 15 allows the spring member 14 to be selectively mounted in two different orientations or positions (i.e. a first position or first biasing state corresponding to high-normal and a second position or second biasing state corresponding to low-normal).

The biasing member connection structure 15 is capable of selectively latching the spring member 14 in either the first biasing state corresponding to high-normal or the second biasing state corresponding to low-normal, as discussed above. The biasing member connection structure 15 has a first latching component 22 that is provided on the base member 10 and is capable of latching the first end 14a of the biasing member (spring) 14, and a second latching component 23 that is provided on the movable member and is capable of latching the second end 14b of the biasing member (spring) 14.

Figure 6:
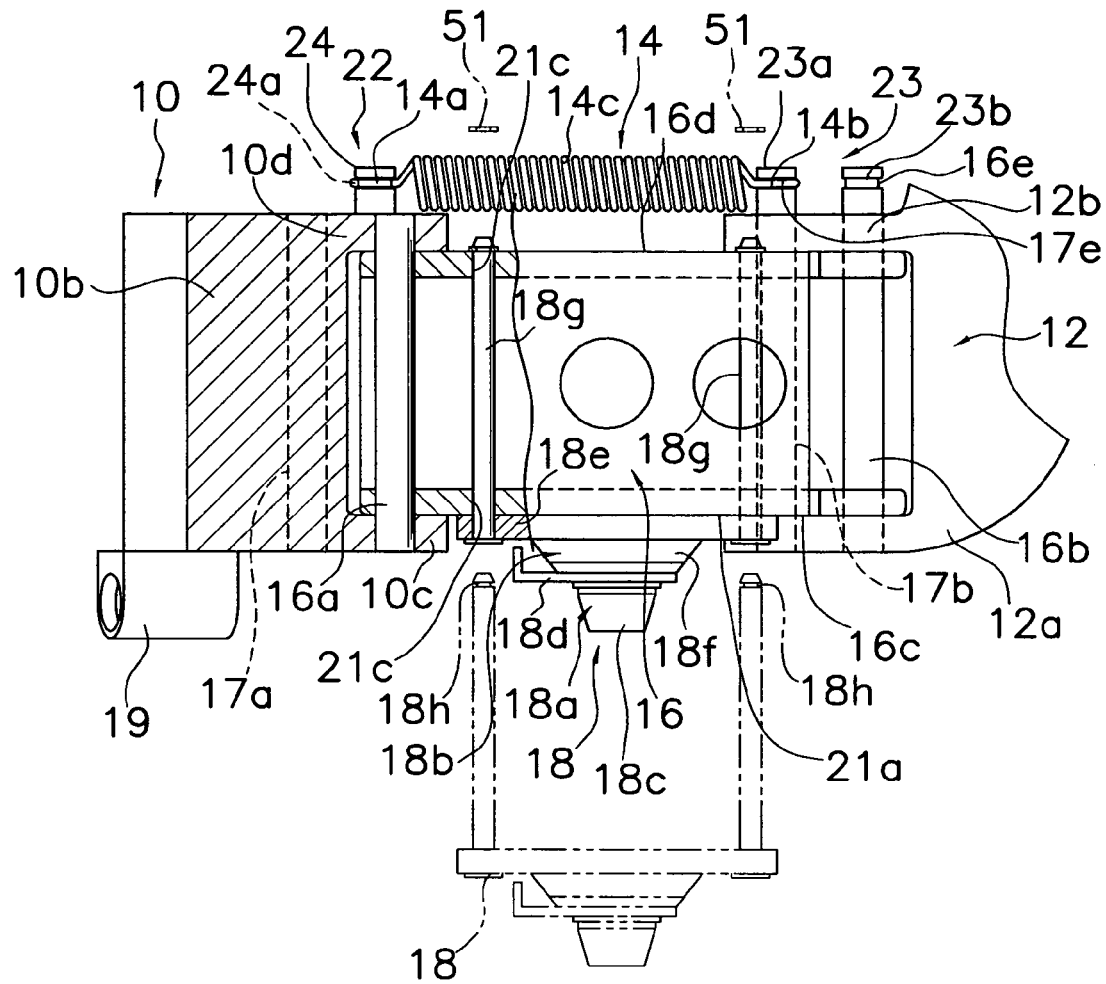
FIG. 6 is a partially cut-away side inclined view of the area near the linkage assembly illustrated in FIGS. 4 and 5.

The first latching component 22 has, for example, a (first) latching pin 24 provided on the link support portion 10d of the base member 10 that is disposed closer to the frame 102 than the link support portion 10c. The latching pin 24 is a shaft member having an annular spring latching groove 24a, as best seen in FIGS. 4 and 6. The latching pin 24 is fixedly attached to the link support portion 10d using a suitable fixing technique such as crimping or adhesive bonding. The latching pin 24 is preferably located between the pivot pins 16a and 17a.

The second latching component 23 is arranged to protrude upwardly (toward the frame 102) from the second link support portion 12b of the movable member 12. The second latching component 23 is capable of latching the second end 14b of the biasing member 14 at either a first position (shown in FIG. 4) or a second position (shown in FIG. 7) that is relatively farther away from the frame 102 than the first position. The second latching component 23 includes a (first) inner pin portion 23a and a (second) outer pin portion 23b. The first biasing state is produced when the biasing member 14 is latched to the first latching component 22 and the inner pin portion 23a of the second latching component 23. Likewise, the second biasing state is produced when the biasing member 14 is latched to the first latching component 22 and the outer pin portion 23b of the second latching component 23. Specifically, in the first biasing state, the biasing member 14 biases the movable member 12 away from the frame 102 (away from the center plane of the bicycle 101), resulting in a high-normal type rear derailleur 97r. With a high-normal rear derailleur, as discussed above, the chain 95 is disposed at the smallest-diameter sprocket R9 in the initial position (i.e. the derailleur 97r is normally biased to shift the chain 95 to the sprocket R9). In the second biasing state, the biasing member 14 biases the movable member 12 toward the frame 102 (toward the center plane of the bicycle 101), resulting in a low-normal type rear derailleur 97r. With a low-normal rear derailleur, as discussed above, the chain 95 is disposed at the largest-diameter sprocket R1 in the initial position (i.e. the derailleur 97r is normally biased to shift the chain 95 to the sprocket R1). The sprocket R9 is considered the top or high rear sprocket, while the sprocket R1 is considered the bottom or low rear sprocket. In this embodiment, the second latching component 23 is designed as parts of the pivot pins 16b and 17b that extend upward (toward the frame 102) from the link support portion 12b. In other words, the inner and outer pin portions 23a and 23b are parts of the pivot pins 17 and 16, respectively. Annular spring latching grooves 17e and 16e are formed at the distal ends of the pivot pins 17b and 16b, respectively, i.e. in the inner and outer pin portions 23a and 23b. The pivot pins 16b and 17b are disposed spaced apart in the directions toward and away from the frame 102. However, the design may instead be such that the second link support portion 12b is provided with two different (separate) latching members spaced apart vertically and laterally (in directions substantially toward and away from the frame 102), and the inner pin portion 23a and the outer pin portion 23b could be produced by these two latching members.

Figure 5:
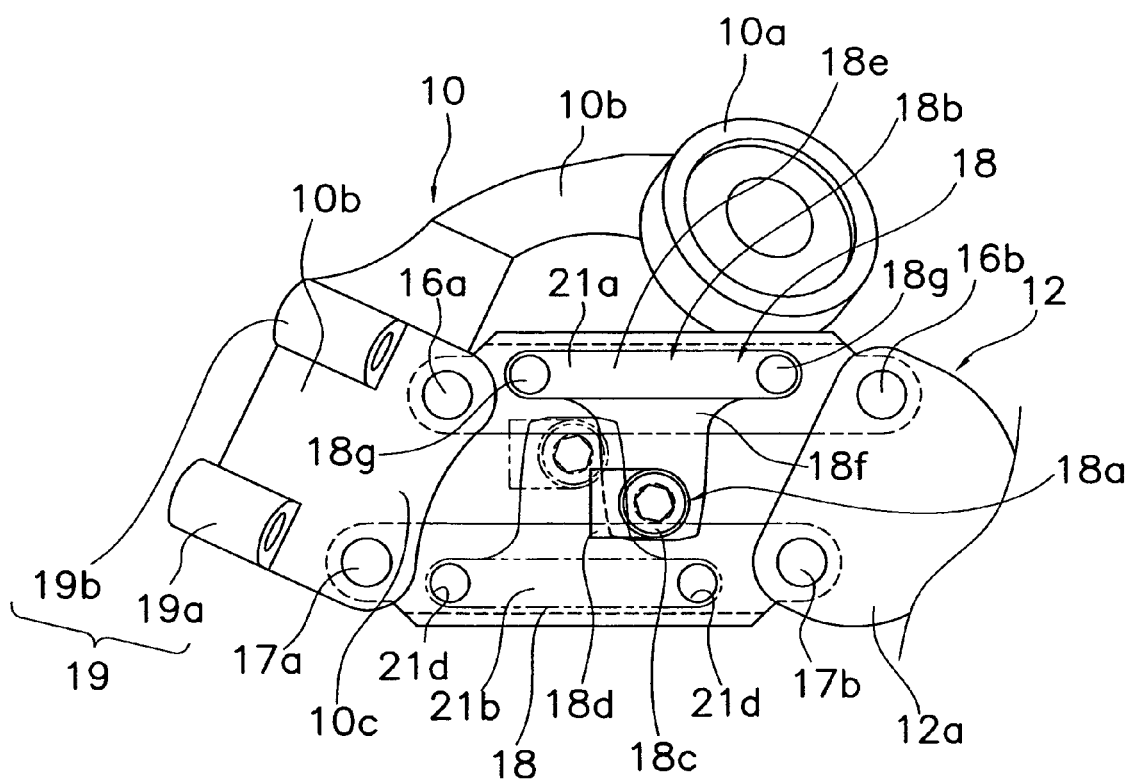
FIG. 5 is a partial, bottom inclined view of the area near the linkage assembly illustrated in FIG. 3.

The inner wire connection structure 18 is mounted on the outer surface 16c of the outer link member 16 when the biasing member 14 is mounted in the first biasing state (high normal), and is mounted on the outer surface 17c of the inner link member 17 when the biasing member 14 is mounted in the second biasing state (low normal), as best understood from FIGS. 5 and 6. As shown in FIG. 6, the inner wire connection structure 18 basically includes a cable latching component 18a and a (latching component) main body component 18b. The cable latching component 18a is configured and arranged to adjustably attach the inner wire 115a to the inner wire connection structure 18. The main body component 18b is removably attached (mounted) to either the outer link member 16 or the inner link member 17, depending on the arrangement or biasing state of the biasing member 14. The cable latching component 18a includes an inner fixing bolt 18c and a wire (cable) retainer 18d. The inner fixing bolt 18c is preferably a hex socket cap bolt that is threadedly attached to the main body component 18b. The cable retainer 18d is disposed between the inner fixing bolt 18c and the main body component 18b. The inner wire 115a is fixedly attached to the inner wire connection structure 18 by sandwiching the distal end of the inner wire 115a between the cable retainer 18d and part of the main body component 18b and then tightening the inner fixing bolt 18c to squeeze the inner wire 115a.

The (latching component) main body component 18b basically includes a base member 18e, a (inner fixing component) retainer opposing portion 18f and a pair of mounting shafts 18g. The base member 18e is constructed as an elliptical plate disposed (mounted to) either of the mounting sections 21a and 21b depending on the type of biasing state desired. The retainer opposing portion 18f protrudes from the base member 18e to squeeze the inner wire 115a between the retainer opposing portion 18f and the cable retainer 18d. The mounting shafts 18g are fixedly attached to the ends of the base member 18e. The plate-shaped base member 18e is attached to either of the mounting sections 21a and 21b using the mounting shafts 18g. The retainer opposing portion 18f extends away from the link member 16 or 17 to which it is attached toward the other link member 17 or 16. In other words, retainer opposing portion 18f extends toward the link member 16 or 17 where it is not mounted, i.e. toward the link member on the opposite side from where it is mounted. The inner fixing bolt 18c is threaded into a corresponding threaded opening formed in the distal end of the retainer opposing portion 18f. The pair of mounting shafts 18g are fixedly attached to the ends of the base member 18e by crimping, for example, and are long enough to pass all the way through the through holes 21c and 21d formed in the link members 16 and 17. Each of the mounting shafts 18g is tapered at its distal ends, and an annular groove 18h is formed at the base portion of the taper. Retaining (anti-slip) members 51, such as E-snap rings or C-snap rings, are mounted in these annular grooves 18h. This keeps the inner wire connection structure 18 from coming off the link member 16 or 17, and removably attaches the inner wire connection structure 18 to either of the link members 16 or 17. The retaining (anti-slip) members 51 are not limited to being snap rings, and can comprise cotter pins or any other configuration as long as they prevent the mounting shafts 18g from coming off during normal use.

In FIG. 6, the state prior to the mounting of the inner wire connection structure 18 is illustrated by phantom lines. As discussed above, the inner wire connection structure 18 is mounted to the outer surface 16c or 17c of either the link member 16 or 17 depending on the biasing state desired for the derailleur 97r. As a result, flexion of the inner wire 115a can be suppressed from the outer latching position to the inner latching position, affording smoother movement of the inner wire.

As shown in FIGS. 2, 3, and 5, the outer casing connection structure 19 is provided at the lower surface of the arm portion 10b of the base member 10, and has a first outer casing connection element 19a capable of holding the outer casing 115b at a first position corresponding to high-normal, and a second outer casing connection element 19b capable of holding the outer casing 115b at a second position corresponding to low-normal (farther away from the frame 102 than the first position). The first and second outer casing connection elements 19a and 19b have holes 19c and 19d, respectively, into which is selectively threaded an outer holding member or outer adjustment member (barrel adjuster) 50 depending on the biasing state desired. The threaded holes 19c and 19d are in communication with through holes 19e and 19f, respectively, through which the inner wire 115a can pass to form stepped holes. The end of the outer casing 115b is received (mounted) in the outer adjustment member 50. Rotating this outer adjustment member (barrel adjuster) 50 changes the cable position of the outer casing 115b, and thus, the tension of the inner wire 115a can be adjusted. The lateral position of the chain guide 13 of the rear derailleur 97r can be adjusted by adjusting the tension of the inner wire 115a. Accordingly, the lateral position of the chain guide 13 of the rear derailleur 97r can be adjusted by rotating the outer adjustment member 50 for minor lateral adjustments due to cable stretching, minor misalignment, or the like.

Operation of Rear Derailleur

As shown in FIG. 4, with the rear derailleur 97r constructed as above, when the two ends 14a and 14b of the biasing member (spring) 14 are latched to the first latching component 22 and the inner pin portion 23a of the second latching component 23 of the biasing member connection structure 15, the biasing member 14 biases the movable member 12 away from the frame 102, so the rear derailleur 97r operates as a high normal type. Therefore, when the shift control device 110r is operated and the inner wire 115a of the shift cable 115r is pulled, the action of the linkage assembly (mechanism) 11 causes the chain guide 13 to move to the low, inner side (that is, toward the sprocket R1 side), and when the cable is released, the chain guide 13 moves to the high, outer side (that is, toward the sprocket R9 side).

Figure 7:
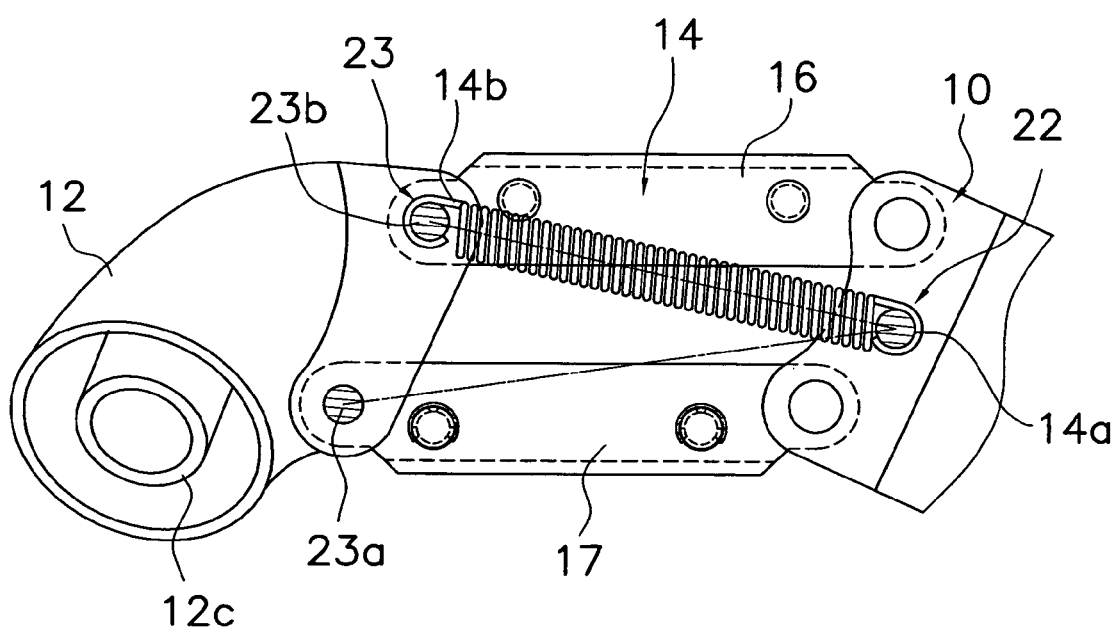
FIG. 7 is a partial, top inclined view of the area near the linkage assembly of the rear derailleur illustrated in FIGS. 1-3, with the biasing member located in the second biasing state.

On the other hand, as shown in FIG. 7, when the ends 14a and 14b of the biasing member (spring) 14 are latched to the first latching component 22 and the outer pin portion 23b of the second latching component 23 of the biasing member connection structure 15, the biasing member 14 biases the movable member 12 toward the frame 102, so the rear derailleur 97r operates as a low normal type. Therefore, when the shift control device 110r is operated and the inner wire 115a of the shift cable 115r is pulled, the action of the linkage assembly (mechanism) 11 causes the chain guide 13 to move to the high, outer side (that is, toward the sprocket R9 side), and when the cable is released, the chain guide 13 moves to the low, inner side (that is, toward the sprocket R1 side).

With a high-normal rear derailleur, since a downshift is performed by pulling on the inner wire, the operating effort is relatively high, but the chain can be guided by overshifting. With a low-normal rear derailleur, meanwhile, since a downshift is performed by the biasing force of the spring member 14 when the tension on the inner wire 115a is released, less effort is required for a downshift, and downshifting is also faster.

As explained above, the rear derailleur 97r of this embodiment can be easily changed from a low normal type to a high normal type by simply relocating the biasing (spring) member 14. Preferably, inner wire connection structure 18 and the outer casing connection structure 19 are also reconfigured (switched) when the desired biasing state is changed in order to achieve optimum performance of the rear derailleur 97r in both biasing states, as explained above.

Figure 13:
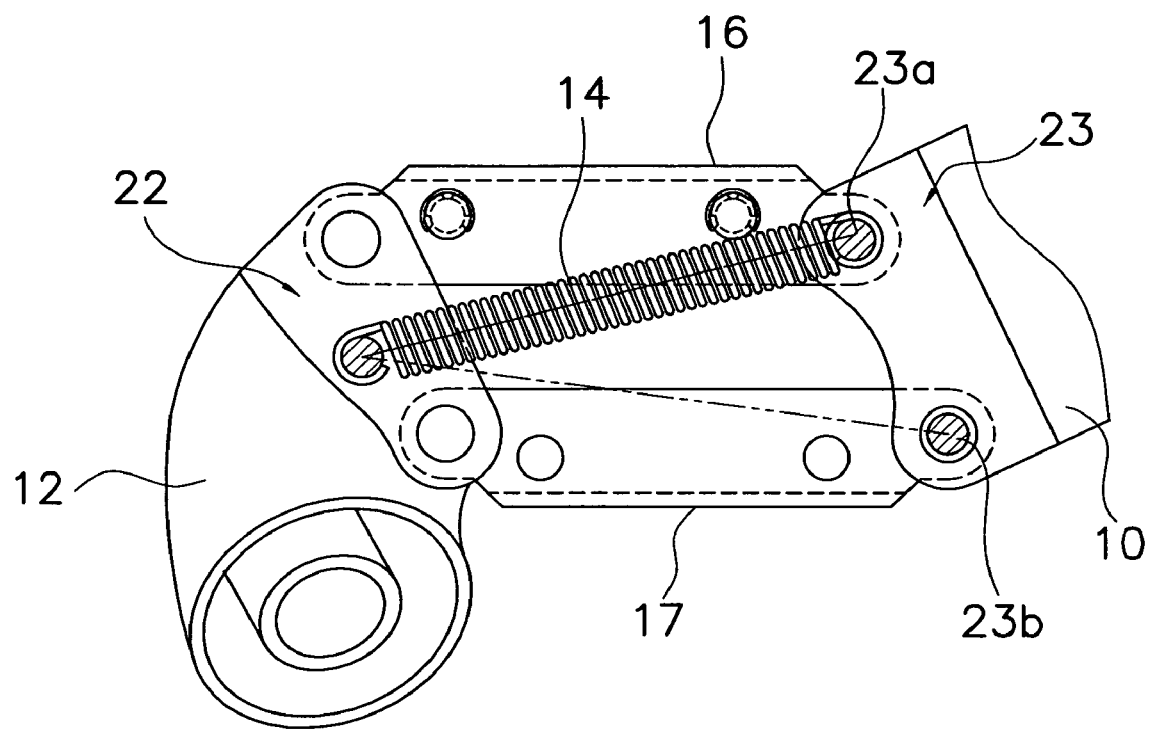
FIG. 13 is a view similar to FIG. 4, illustrating a modification of the first embodiment (i.e. another embodiment of the present invention)

FIG. 13 illustrates a possible modification of the first embodiment illustrated in FIGS. 1-7, in which the first latching component 22 of the biasing member connection structure 15 is provided at the movable member 12, and the second latching component 23 having the first pin portion 23a and the second pin portion 23b is provided at the base member 10. Here again, the first biasing state is produced when the spring member 14 is latched to the first latching component 22 and the inner pin portion 23a, while the second biasing state is produced when the spring member 14 is latched to the first latching component 22 and the outer pin portion 23b. However, with this arrangement, the first pin portion 23a is located outwardly further from the frame 102 than the second pin portion 23b. Thus, the first pin portion 23a can be referred to as an outer pin portion, while the second pin portion 23b can be referred to as an inner pin portion 23b.

Second Embodiment

Figure 8:
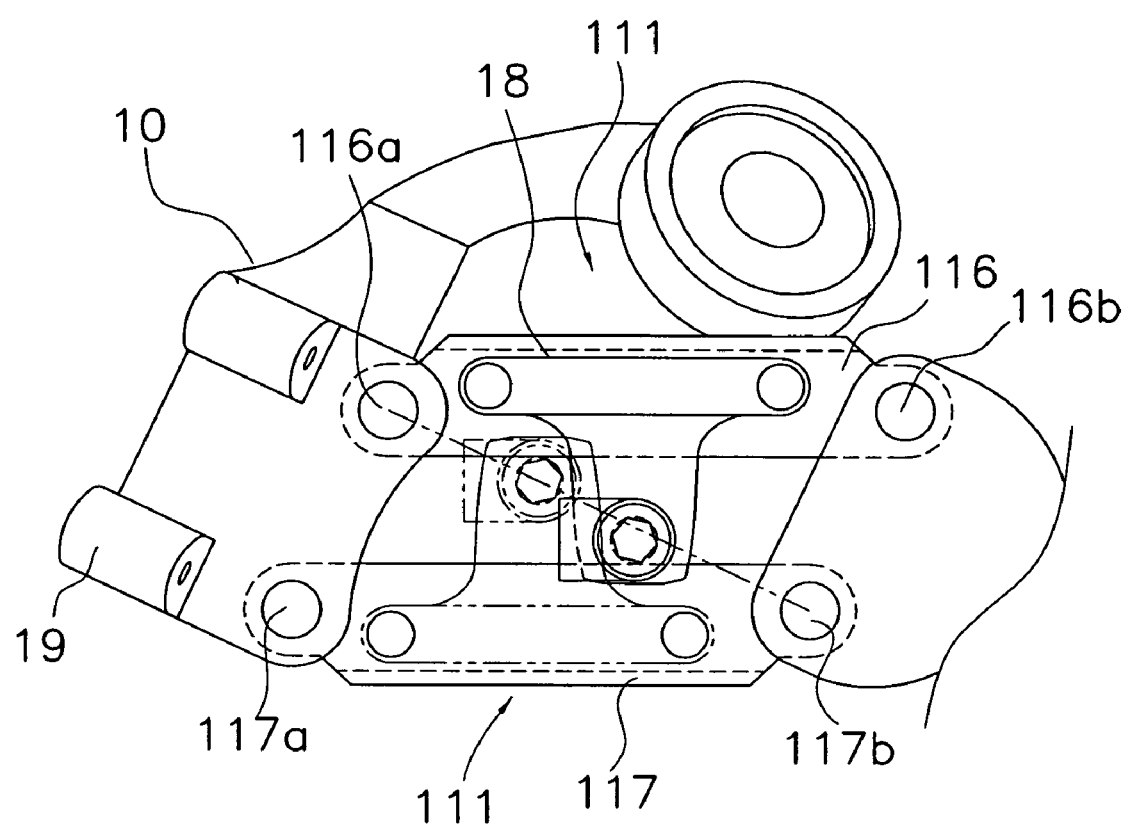
FIG. 8 is a partial, bottom inclined view of the area near the linkage assembly of a rear derailleur in accordance with a second embodiment of the present invention.
Figure 9:
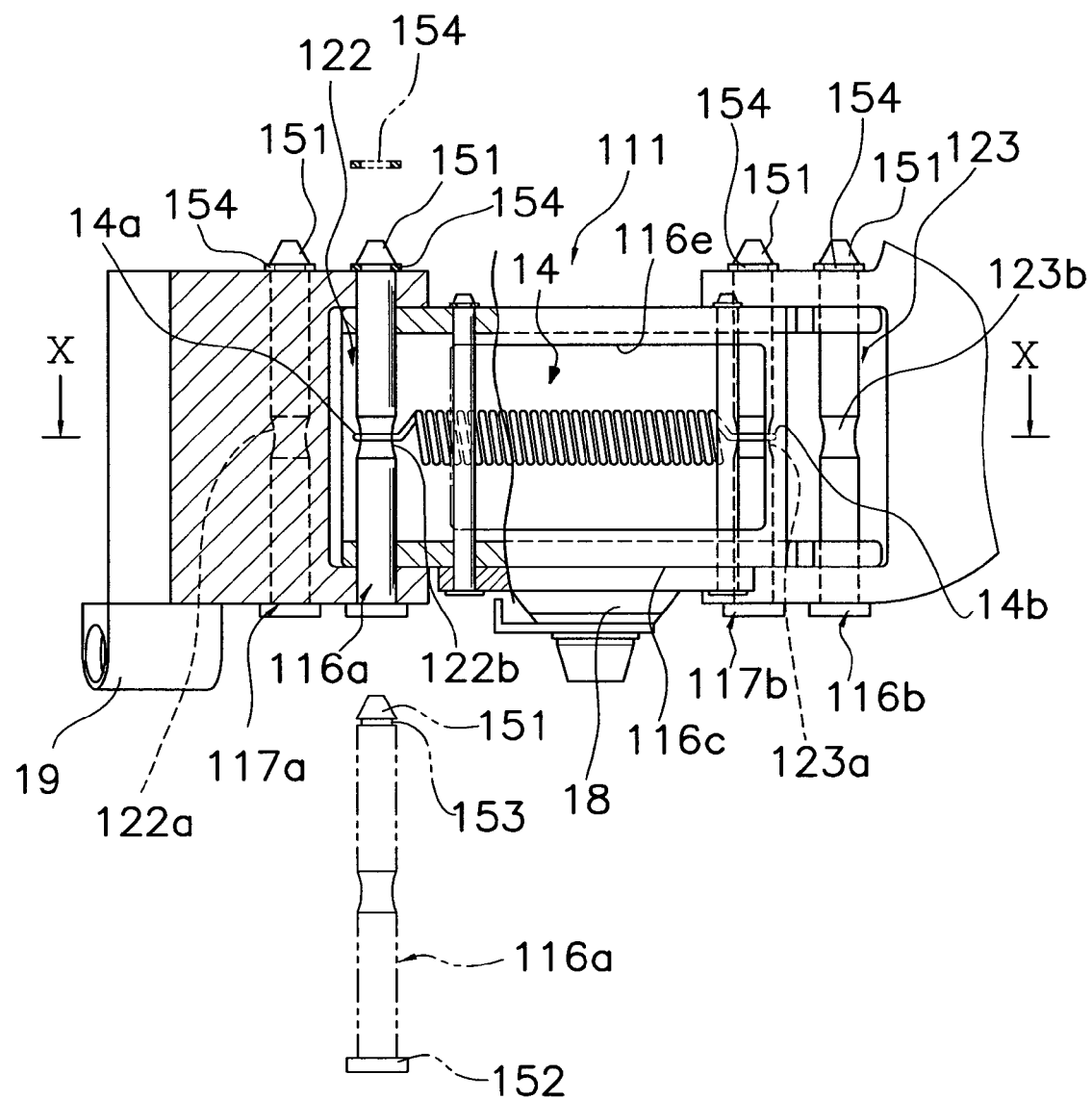
FIG. 9 is a partially cut-away side inclined view of the area near the linkage assembly illustrated in FIG. 8.
Figure 10:
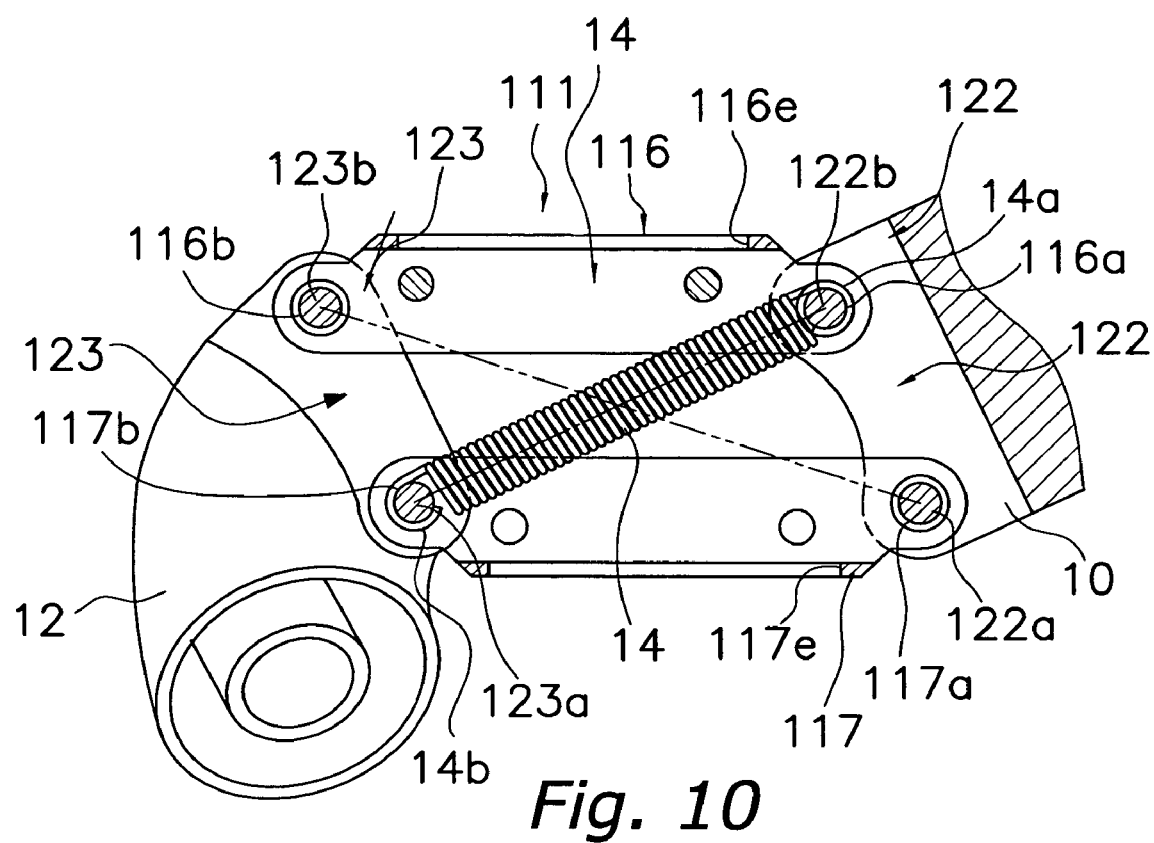
FIG. 10 is a partial, top inclined view of the area near the linkage assembly of the rear derailleur illustrated in FIGS. 8 and 9, with the biasing member located in the first biasing state.

Referring now to FIGS. 8-10, parts of a rear derailleur in accordance with a second embodiment of the present invention will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. However, it will be apparent to those skilled in the art from this disclosure that the descriptions and illustrations of the first embodiment also apply to this second embodiment, except as explained and illustrated herein.

In the first embodiment, just one first latching component 22 was provided (i.e. a single mounting pin for mounting one end of the biasing member 14 in a single position/location). However, as shown in FIGS. 8-10, modified first and second latching components 122 and 123 can be provided instead of the first and second latching components 22 and 23 of the first embodiment to form a modified biasing member connection structure. The first latching component 122 includes two pin portions 122a and 122b similar to the pin portions 23a and 23b of the first embodiment. Similarly, the second latching component includes two pin portions 123a and 123b similar to the pin portions 23a and 23b of the first embodiment. Specifically, in this embodiment, the second latching component 123 includes an inner (first) pin portion 123a and an outer (second) pin portion 123b, while the first latching component 122 includes an additional (third) inner pin portion 122a and an additional (fourth) outer pin portion 122b. The biasing member 14 can be selectively latched on the pin portions 122a, 122b, 123a and 123b to achieve first and second biasing states in a manner similar to the first embodiment, as explained below.

In the second embodiment shown in FIGS. 8-10, the fourth pin portion 122b is formed in the middle part of a pivot (linking) pin 116a and includes an annular recess, while the third pin portion 122b is formed in the middle part of a pivot (linking) pin 117a and also includes an annular recess. Similarly, the second pin portion 123b is formed in the middle part of a pivot (linking) pin 116b and also includes an annular recess, while the first pin portion 123a is formed in the middle part of a pivot (linking) pin 117b and also includes an annular recess. Thus, the pivot pins 116a, 116b, 117a and 117b are modified versions of the pivot pins 16a, 16b, 17a and 17b of the first embodiment. With this arrangement, the first biasing state is produced when the two ends 14a and 14b of the spring member 14 are latched to the fourth pin portion 122b (in a fourth position) and the first pin portion 123a (in a first position), respectively, and the rear derailleur is a high normal type. Likewise, with this arrangement, the second biasing state is produced when the ends 14a and 14b of the spring member 14 are latched to the third pin portion 122a (in a third position) and the second pin portion 123b (in a second position), respectively, and the rear derailleur is a low normal type. The position of the biasing member 14 in the second biasing state is indicated by the phantom lines in FIG. 10 for the sake of convenience. The biasing member 14 is mounted a vertical position X, corresponding substantially to the vertical middle area of the link members 116 and 117.

Rectangular (for example) openings 116e and 117e are formed in a modified outer link member 116 and a modified inner link member 117 for access to the biasing member 14. The openings 116e and 117e are formed in the parallel sides of the link members 116 and 117, as best seen in FIG. 10. The presence of these openings 116e and 117e makes it easier to relocate the latching position of the spring member 14 in order to change the biasing state, since a finger can be inserted through the openings 116e and 117e. The link members 116 and 117 form parts of a modified linkage assembly (mechanism) 111 similar to the first embodiment.

As shown in FIG. 9, each of the pivot pins 116a, 116b, 117a, and 117b has a tapered surface 151 at its distal end, a larger-diameter head 152 at its proximal end and an annular groove 153 on the base side of the tapered surface 151. A retaining (anti-slip) member 154, such as an E-snap ring or C-snap ring, is mounted in this annular groove 153. This keeps the pivot pins 116a, 116b, 117a, and 117b from coming off of the link member 116 or 117 unless desired, and removably fixedly attaches these pivot pins to the respective one of the link members 116 and 117. In this second embodiment, the pivot pins 116a, 116b, 117a, and 117b are mounted from the outer/lower surfaces of the link members 116 and 117 away from the frame 102, as seen in FIG. 9. However, the pivot pins 116a, 116b, 117a, and 117b may instead be mounted from the inner/upper surfaces.

In this second embodiment, the biasing (spring) member 14 is disposed on the inside of the linkage assembly (mechanism) 111, and more specifically, in between the outer link member 116 and the inner link member 117. However, the biasing (spring) member 14 may instead be disposed on the outside of the linkage assembly (mechanism) 111 just as in the first embodiment. With such an arrangement, the first latching component 122 and the second latching component 123 may be provided at the base member 10 and the movable member 12 independently from the pivot pins 116a, 116b, 117a, and 117b, or can be constructed as parts of the pivot pins 116a, 116b, 117a, and 117b in a manner like to the second latching component 23 of the first embodiment. In any case, the rest of the constitution of the base member 10, the movable member 12, the chain guide 13, the inner wire connection structure 18, the outer casing connection structure 19, and so forth is the same as in the above embodiment and will therefore not be described again.

Third Embodiment

Figure 11:
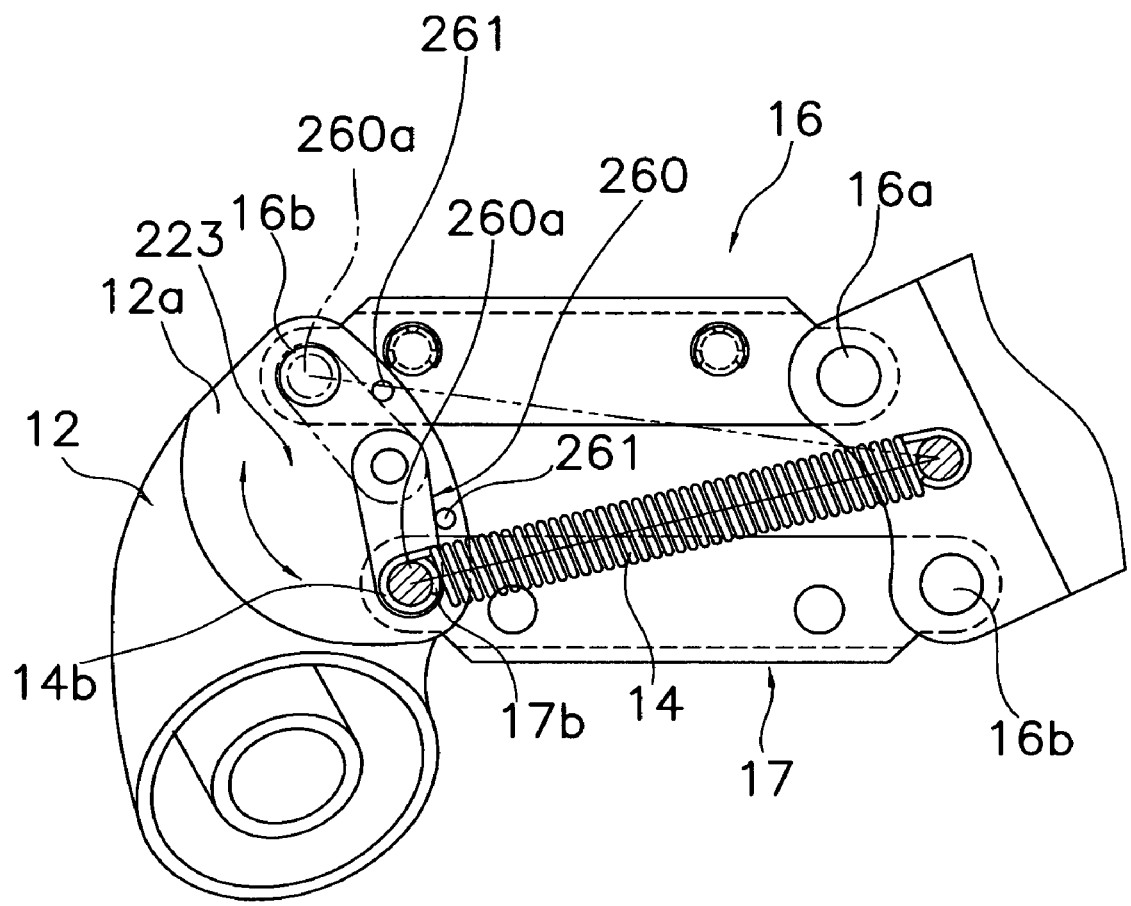
FIG. 11 is a partial, top inclined view of the area near the linkage assembly of a rear derailleur in accordance with a third embodiment of the present invention, with the biasing member located in the first biasing state.

Referring now to FIG. 11, parts of a rear derailleur in accordance with a third embodiment of the present invention will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. However, it will be apparent to those skilled in the art from this disclosure that the descriptions and illustrations of the first embodiment also apply to this third embodiment, except as explained and illustrated herein.

In the above two embodiments, the second latching component 23 or 123 consisted of two members, namely, the inner pin portion 23a or 123a and the outer pin portion 23b or 123b. However, as shown in FIG. 11, a modified second latching component 223 may be provided instead of the latching component 23 or 123. The second latching component 223 in accordance with this third embodiment includes a pivoting member 260 whose distal end can be disposed at a first position (substantially corresponding to the location of the pivot pin 17b) or a second position (substantially corresponding to the location of the pivot pin 16b). The pivoting member 260 is shown in phantom lines in the second position in FIG. 11. The pivoting member 260 has its proximal end pivotally mounted on the inner surface of the link support portion 12a of the movable member 12 between the pivot pin 16b and the pivot pin 17b. A latching pin (spring connector) 260a to which the second end 14b of the biasing (spring) member 14 is latched is provided at the distal end of the pivoting member 260. The pivoting member 260 is positioned at the first and second positions by a pair of stopper members 261 provided on the link support portion 12a, and is able to pivot between the first position and the second position. In this third embodiment, the first and second positions of the latching pin 260a are the same as the positions of the pivot pins 17b and 16b, but may be different positions as long as the movement caused by the biasing member 14 is toward or away from the frame 102. In this third embodiment, the first biasing state is produced when the pivoting member 260 is positioned at the first position as indicated by the solid lines in FIG. 11, and the second biasing state is produced when the pivoting member 260 is positioned at the second position as indicated by the phantom lines. In this case, switching the biasing state is relatively easy since the pivoting member 260 need only be positioned at one of two positions, and the biasing member 14 need not be removed from the latching pin 260a to change the biasing state. The position of the biasing member 14 in the second biasing state is illustrated by a phantom line in FIG. 11.

Figure 12:
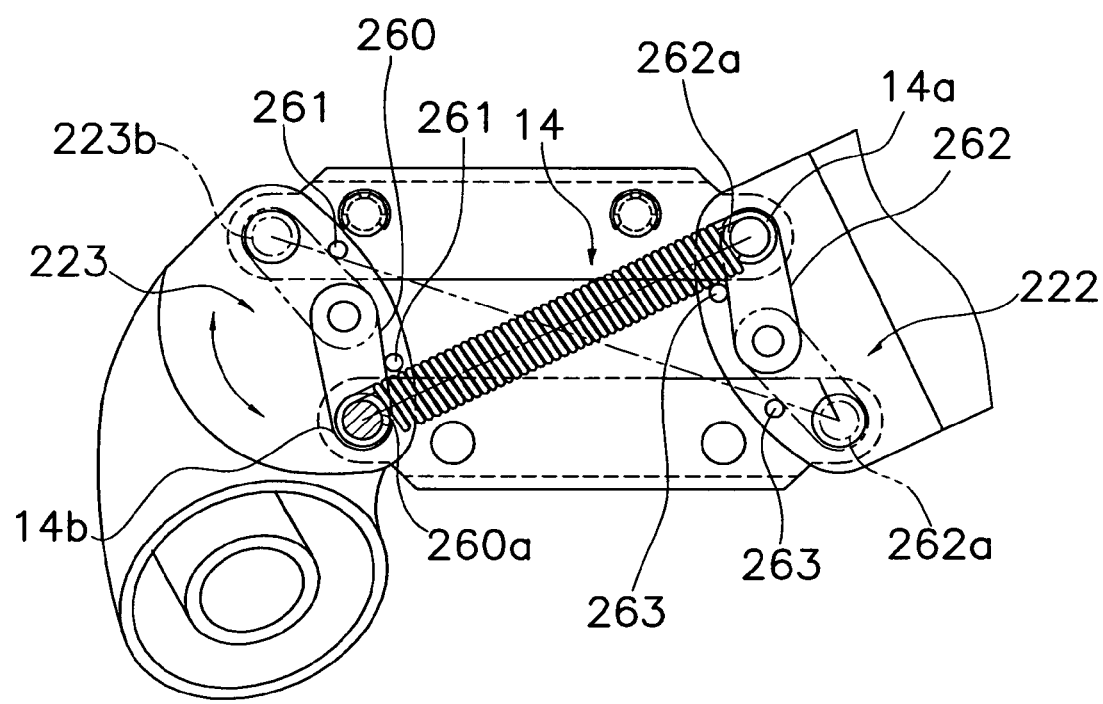
FIG. 12 is a view similar to FIG. 11, illustrating a modification of the third embodiment (i.e. another embodiment of the present invention)

Referring now to FIG. 12, as a modification of the third embodiment, the stationary first latching component (not numbered in this embodiment) may be provided at the movable member 12, and the pivoting member 260 may be provided as the second latching component 223 at the base member 10. In other words, the arrangement of the latching components can be reversed (i.e. in a manner similar to the reversed arrangement of FIG. 13, but utilizing the latching component 223 on the base member 10). Also, as shown in FIG. 12, pivoting members 262 and 260 may be provided on both the base member 10 and the movable member 12, respectively. In this case, the first latching component 222 also includes a pivoting member 262 that is identical to the pivoting member 260, in addition to the second latching component 223 with the pivoting member 260. The pivoting member 262 of the first latching component 222 can be positioned with its distal end at a third position indicated by the phantom lines in FIG. 12 or with its distal end in a fourth position indicated by solid lines in FIG. 12. The pivoting member 260 is positioned at the third and fourth positions by a pair of stopper members 263, and is able to pivot between the third position and the fourth position just like the pivoting member 260 as in the third embodiment. A latching pin (spring connector) 262a to which the first end 14a of the biasing (spring) member 14 is latched is provided at the distal end of the pivoting member 262. With this modification, just as in the second embodiment, the first biasing state is produced when the pivoting members 260 and 262 are positioned at the first position and the fourth position, respectively. Similarly, the second biasing state is produced when the pivoting members 260 and 262 are positioned at the second position and the third position, respectively.

Other Embodiments (a) In the above embodiments, a manual rear derailleur for a mountain type bicycle was described. However, it will be apparent to those skilled in the art from this disclosure that the present invention is not limited to this, and may be any kind of rear derailleur having a linkage assembly, and may be an electrically, hydraulically, or pneumatically driven rear derailleur.

(b) In the above embodiments, the first and second latching components were comprised of one or more shaft members (pin portions or latching pins). However, it will be apparent to those skilled in the art from this disclosure that the first and second latching components may be any configuration that allows the ends of the spring member to be latched. For instance, they may be hook-shaped portions formed integrally with the link members.

(c) In the above embodiments, a coil spring was given as an example of the biasing member. However, it will be apparent to those skilled in the art from this disclosure that the biasing member may have any configuration that allows the biasing direction to be changed by means of relocation. For instance, it may be a torsion coil spring that can be wound around the outside of a pivot pin.

Figure 14:
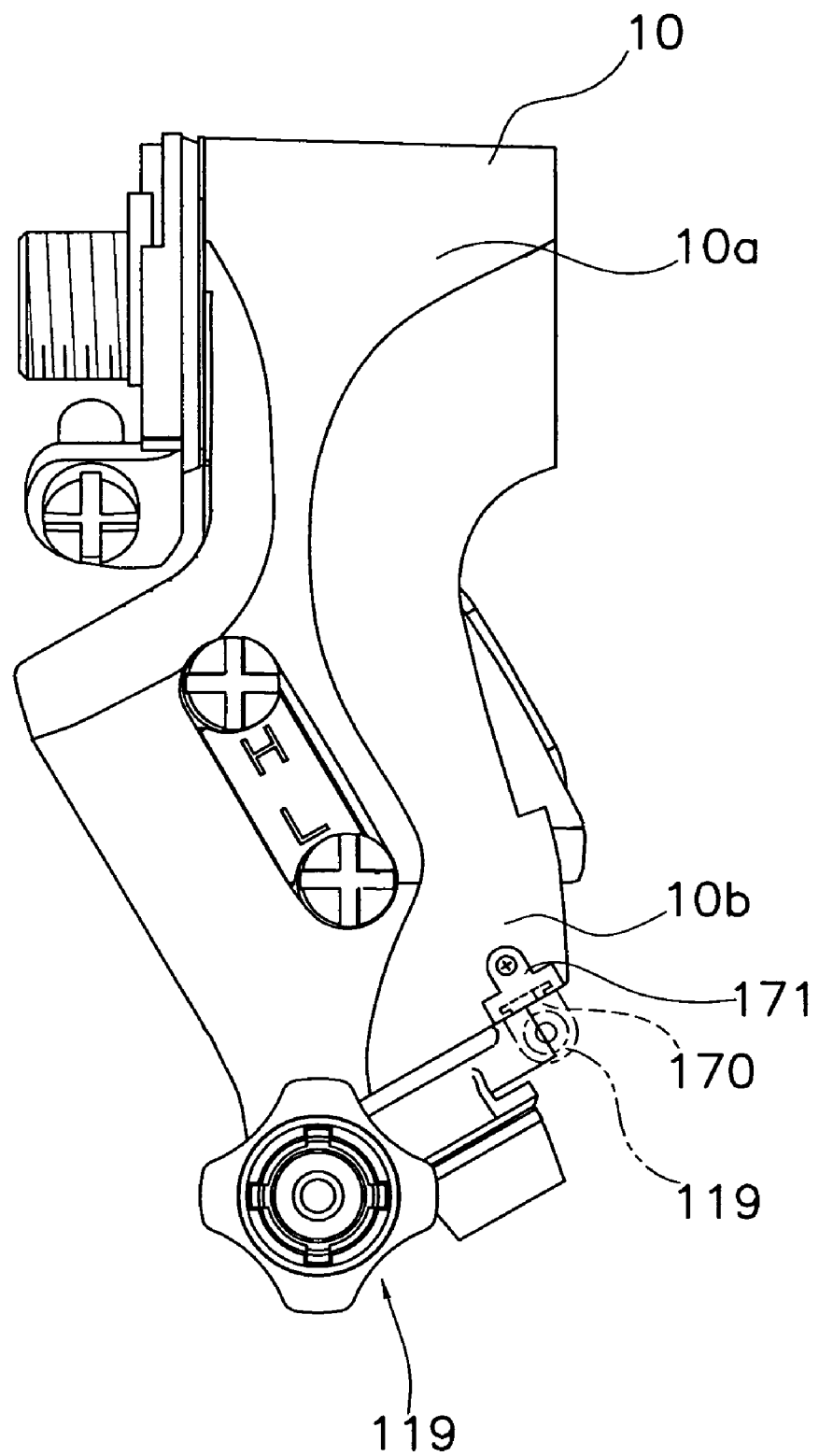
FIG. 14 is a view similar to FIG. 3, illustrating a modification of the first embodiment (i.e. another embodiment of the present invention).

(d) In the above embodiments, the outer casing connection structure 19 included the pair of outer casing connection elements (components) 19a and 19b integrally formed with the base member 10. However, it will be apparent to those skilled in the art from this disclosure that an outer casing connection element may instead be removable from the base member 10, in a manner similar to the inner wire connection structure 18. In FIG. 14, a latching component mount 170 is provided that allows the removable mounting of outer casing connection structure (latching component) 119 at two places on the lower surface of the base member 10 (the part of the latching component mount 170 with the outer casing connection structure (latching component) 119 coupled thereto is not shown in FIG. 14). The latching component mounts 170 include grooves, for example, and the outer casing connection structure (latching component) 119 is mounted by sliding it into one of these grooves. Of these latching component mounts 170, the one not being used is blocked off by a cover member 171, for example. In this case, since the outer casing connection structure (latching component) 119 is removable, a single outer casing connection structure (latching component) 119 can be mounted at either of two latching positions of the latching component mount according to (depending on) the biasing state desired.

(e) In the above embodiments, the inner wire connection structure 18 was removable from the link members 16 and 17, and the mounting position was changed between high and low normal mounting positions. However, it will be apparent to those skilled in the art from this disclosure that a fixed inner latching component may be provided to each of the link members 16 and 17. Also, it will be apparent to those skilled in the art from this disclosure that the inner wire connection structure may be provided on the movable member.

(f) In the above embodiments, as shown in FIG. 3, two (outer latching components) outer casing connection elements 19a and 19b were lined up substantially horizontally at the linking portion on the same sides of the inner link member and the outer link member as the base member 10. However, it will be apparent to those skilled in the art from this disclosure that two (outer latching components) outer casing connection elements may be disposed substantially vertically along the diagonal line of the base member in FIG. 3. In this case, the (inner latching component) inner wire connection structure is also disposed vertically, just as with the (outer latching components) outer casing connection elements. Furthermore, the (outer latching components) outer casing connection elements may be provided in just one place, rather than two. Also, a single (outer latching component) outer casing connection element may pivot to either of two positions according to the biasing state desired by providing it to the distal end of the pivoting member in a manner like the second latching component shown in FIG. 11.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" or other similar terms when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rear derailleur comprising:
   a base member configured and arranged to be mounted to a rear part of a bicycle frame;
   a linkage assembly pivotally coupled to the base member;
   a movable member pivotally coupled to the linkage assembly such that the movable member is capable of movement toward and away from the bicycle frame;
   a chain guide pivotally coupled to the movable member;
   a biasing member arranged to bias the movable member relative to the base member;
   a biasing member connection structure configured and arranged to selectively mount the biasing member to the rear derailleur in a first biasing state when the biasing member is coupled in a first biasing position and a second biasing state when the biasing member is coupled in a second biasing position, the biasing member being arranged to bias the movable member away from the bicycle frame in the first biasing state and the biasing member being arranged to bias the movable member toward the bicycle frame in the second biasing state; and
   an inner wire connection structure arranged and configured to attach an inner wire of a shift cable thereto, the inner wire connection structure being movably arranged to be mounted in a first inner wire latching position when the biasing member is mounted to the rear derailleur in the first biasing state and to be mounted in a second inner wire latching position when the biasing member is mounted to the rear derailleur in the second biasing state, with the first and second inner wire latching positions being different mounting locations with respect to the linkage assembly.

2. The bicycle rear derailleur according to claim 1, wherein the linkage assembly includes an inner link member and an outer link member located further from the bicycle frame than the inner link member, each of the inner and outer link members being pivotally coupled to both the base member and the movable member.

3. The bicycle rear derailleur according to claim 2, wherein the inner and outer link members are spaced from each other to form an internal area of the linkage assembly therebetween, and the biasing member is disposed outside of the internal area of the linkage assembly.

4. The bicycle rear derailleur according to claim 2, wherein the inner and outer link members are spaced from each other to form an internal area of the linkage assembly therebetween, and the biasing member is disposed within the internal area of the linkage assembly.

5. The bicycle rear derailleur according to claim 2, wherein the biasing member is a coil spring having a first end, a second end, and a coil component disposed between the first and second ends; and
   the biasing member connection structure includes a first latching component provided at the base member that is arranged and configured to attach the first end of the coil spring thereto, and
   a second latching component provided at the movable member that is arranged and configured to selectively attach the second end of the coil spring thereto in an inner position to achieve the first biasing state when the biasing member is in the first biasing position and in an outer position that is farther away from the bicycle frame than the inner position to achieve the second biasing state when the biasing member is in the second biasing position.

6. The bicycle rear derailleur according to claim 2, wherein
the biasing member is a coil spring having a first end, a second end, and a coil component disposed between the first and second ends; and
the biasing member connection structure includes a first latching component provided at the movable member that is arranged and configured to attach the second end of the coil spring thereto, and
a second latching component provided at the base member that is arranged and configured to selectively attach the first end of the coil spring thereto in an outer position to achieve the first biasing state when the biasing member is in the first biasing position and an inner position that is closer to the bicycle frame than the outer position to achieve the second biasing state when the biasing member is in the second biasing position.

7. The bicycle rear derailleur according to claim 5, wherein
the second latching component includes a pivoting member having a proximal end pivotally mounted at a location between the inner position and the outer position, and a distal end with a spring connector that is movable between the inner and outer positions.

8. The bicycle rear derailleur according to claim 7, wherein
the second latching component further includes a pair of stopper members provided at the movable member to limit movement of the pivoting member when the distal end of the pivoting member is located in the inner and outer positions.

9. The bicycle rear derailleur according to claim 5, wherein
the inner and outer link members are pivotally coupled to the base member at inner and outer base pivot points, and the first latching component is disposed between the inner and outer pivot points.

10. The bicycle rear derailleur according to claim 2, wherein
the biasing member is a coil spring having a first end, a second end, and a coil component disposed between the first and second ends; and
the biasing member connection structure includes a first latching component provided at the base member that is arranged and configured to selectively attach the first end of the coil spring thereto in a third position to achieve the second biasing state when the biasing member is in the second biasing position and a fourth position that is farther away from the bicycle frame than the third position to achieve the first biasing state when the biasing member is in the first biasing position, and
a second latching component is provided at the movable member that is arranged and configured to selectively attach the second end of the coil spring thereto in a first position to achieve the first biasing state when the biasing member is in the first biasing position and in a second position that is farther away from the bicycle frame than the first position to achieve the second biasing state when the biasing member is in the second biasing position.

11. The bicycle rear derailleur according to claim 10, wherein
the inner and outer link members are pivotally coupled to the base member at inner and outer base pivot points, and the third position is disposed at the inner base pivot point and the fourth position is disposed at the outer base pivot point, and
the inner and outer link members are pivotally coupled to the movable member at inner and outer movable pivot points, and the first position is disposed at the inner movable pivot point and the second position is disposed at the outer movable pivot point.

12. The bicycle rear derailleur according to claim 10, wherein
at least one of the first and second latching components includes a pivoting member having a proximal end pivotally mounted at a location between the respective third and fourth positions or the respective first and second positions, and a distal end with a spring connector that is movable between the respective third and fourth positions or the respective first and second positions.

13. The bicycle rear derailleur according to claim 12, wherein
the at least one of the first and second latching components with the pivoting member further includes a pair of stopper members provided at the respective base member or the respective movable member to limit movement of the pivoting member when the distal end of the pivoting member is located in the respective third and fourth positions or the respective first and second positions.

14. The bicycle rear derailleur according to claim 2, wherein
the biasing member is a coil spring having a first end, a second end, and a coil component disposed between the first and second ends; and
the biasing member connection structure includes a first latching component provided at the base member that is arranged and configured to attach the first end of the coil spring thereto, and
a second latching component that is arranged and configured to selectively attach the second end of the coil spring thereto in an inner position at the inner link member to achieve the first biasing state when the biasing member is in the first biasing position and in an outer position at the outer link member to achieve the second biasing state when the biasing member is in the second biasing position.

15. The bicycle rear derailleur according to claim 2, wherein
the biasing member is a coil spring having a first end, a second end, and a coil component disposed between the first and second ends; and
the biasing member connection structure includes a first latching component provided at the movable member that is arranged and configured to attach the second end of the coil spring thereto, and
a second latching component that that is arranged and configured to selectively attach the first end of the coil spring thereto in an outer position at the outer link member to achieve the first biasing state when the biasing member is in the first biasing position and an inner position at the inner link member to achieve the second biasing state when the biasing member is in the second biasing position.

16. The bicycle rear derailleur according to claim 1, wherein
the inner wire connection structure is removably attached to the linkage assembly.

17. The bicycle rear derailleur according to claim 16, wherein
the inner wire connection structure is attached to the outer link member when the biasing member is mounted to the rear derailleur in the first biasing state, and the inner wire connection structure is attached to the inner link member when the biasing member is mounted to the rear derailleur in the second biasing state.

18. The bicycle rear derailleur according to claim 1, further comprising an outer casing connection structure arranged and configured to hold an outer casing of a shift cable, the outer casing connection structure being arranged and configured to hold the outer casing in a first outer latching position when the biasing member is mounted to the rear derailleur in the first biasing state and being arranged and configured to hold the outer casing in a second outer latching position when the biasing member is mounted to the rear derailleur in the second biasing state.

19. The bicycle rear derailleur according to claim 18, wherein the outer casing connection structure includes an outer holding member that is removably attached to the base member, the outer holding member being attached at the first outer latching position when the biasing member is mounted to the rear derailleur in the first biasing state and being attached at the second outer latching position when the biasing member is mounted to the rear derailleur in the second biasing state.

20. The bicycle rear derailleur according to claim 2, wherein the inner link member is pivotally coupled to the base member by a first inner pivot pin and pivotally coupled to the movable member by a second inner pivot pin, and the outer link member is pivotally coupled to the movable member by a first outer pivot pin and pivotally coupled to the movable member by a second outer pivot pins, and at least one of the first pivot pins and second pivot pins are detachably mounted to the inner link member and the outer link member using a removable anti-slip member.

* * * * *